US011539409B2

(12) United States Patent
Ramireddy et al.

(10) Patent No.: US 11,539,409 B2
(45) Date of Patent: Dec. 27, 2022

(54) ANTENNA ARRAY CODEBOOK WITH BEAMFORMING COEFFICIENTS ADAPTED TO AN ARBITRARY ANTENNA RESPONSE OF THE ANTENNA ARRAY

(71) Applicant: Fraunhofer-Gesellschaft zur Förderung der angewandten Forschung e.V., Munich (DE)

(72) Inventors: Venkatesh Ramireddy, Erlangen (DE); Markus Landmann, Erlangen (DE); Marcus Großmann, Erlangen (DE)

(73) Assignee: FRAUNHOFER-GESELLSCHAFT ZUR FÖRDERUNG DER ANGEWANDTEN FORSCHUNG E.V., Munich (DE)

( * ) Notice: Subject to any disclaimer, the term of this patent is extended or adjusted under 35 U.S.C. 154(b) by 78 days.

(21) Appl. No.: 17/130,650

(22) Filed: Dec. 22, 2020

(65) Prior Publication Data

US 2021/0111771 A1 Apr. 15, 2021

Related U.S. Application Data

(63) Continuation of application No. PCT/EP2019/067418, filed on Jun. 28, 2019.

(30) Foreign Application Priority Data

Jun. 29, 2018 (EP) ..................... 18180856

(51) Int. Cl.
*H04B 7/0456* (2017.01)
*H04B 7/06* (2006.01)

(52) U.S. Cl.
CPC ......... *H04B 7/0469* (2013.01); *H04B 7/0482* (2013.01); *H04B 7/0639* (2013.01)

(58) Field of Classification Search
CPC .. H04B 7/0617; H04B 7/0469; H04B 7/0482; H04B 7/0639
(Continued)

(56) References Cited

U.S. PATENT DOCUMENTS 6,900,748 B2   5/2005   Marpe et al.
7,286,710 B2   10/2007  Marpe et al.
(Continued)

FOREIGN PATENT DOCUMENTS

CN    107528617 A    12/2017
CN    110326227 A    10/2019
(Continued)

OTHER PUBLICATIONS

Erik Dahlman et al., "4G: LTE/LTE-Advanced for Mobile Broadband," Academic Press, 2011. (ISBN:012385489X 9780123854896).
(Continued)

*Primary Examiner* — Leila Malek
(74) *Attorney, Agent, or Firm* — Novick, Kim & Lee PLLC; Jae Youn Kim

(57) ABSTRACT

A receiver includes an antenna for a wireless communication with a transmitter and a signal processor to process a radio signal received via a radio channel. The receiver constructs a codebook including sets of beamforming weights for a plurality of directions. The beamforming weights are based on a first antenna array response matrix of a transmitter antenna array. The transmitter selects beamforming weights from the codebook to form a transmit/receive beam pointing in a selected direction. The receiver calculates one or more characteristic matrices based on a model of the transmitter antenna array, and constructs the codebook using a second antenna array response matrix and the one or more calculated characteristic matrices.

22 Claims, 7 Drawing Sheets uniform planar array with dual polarized antennas in FD-MIMO array steering vectors corresponding to the −45° oriented antennas $$F=F_1F_2=\begin{bmatrix}X_H^l\otimes X_V^k & 0\\ 0 & X_H^l\otimes X_V^k\end{bmatrix}F_2$$

array steering vectors corresponding to the +45° oriented antennas selection/ combining/ co-phasing matrix

(58) Field of Classification Search
USPC .......................................................... 375/267
See application file for complete search history.

(56) References Cited

U.S. PATENT DOCUMENTS

| | | | |
|---|---|---|---|
| 7,379,608 B2 | 5/2008 | Marpe et al. | |
| 7,586,924 B2 | 9/2009 | Wiegand | |
| 7,817,723 B2 | 10/2010 | Schumitsch et al. | |
| 8,254,487 B2* | 8/2012 | Tsai | H04B 7/0684 375/267 |
| 8,588,319 B2 | 11/2013 | Kim et al. | |
| 8,724,543 B2 | 5/2014 | Göransson et al. | |
| 8,907,823 B2 | 12/2014 | Kirchhoffer et al. | |
| 8,947,273 B2 | 2/2015 | Bartnik et al. | |
| 9,148,208 B2 | 9/2015 | Chen et al. | |
| 9,219,535 B2 | 12/2015 | Keusgen et al. | |
| 10,547,362 B2 | 1/2020 | Landmann et al. | |
| 2006/0208945 A1* | 9/2006 | Kolanek | H01Q 3/2605 342/383 |
| 2009/0074057 A1 | 3/2009 | Marpe et al. | |
| 2011/0080964 A1 | 4/2011 | Aazhang et al. | |
| 2013/0034157 A1 | 2/2013 | Kirchhoffer et al. | |
| 2013/0034171 A1 | 2/2013 | Kirchhoffer et al. | |
| 2013/0039423 A1 | 2/2013 | Helle et al. | |
| 2013/0077705 A1 | 3/2013 | Thomas et al. | |
| 2014/0105293 A1 | 4/2014 | George et al. | |
| 2014/0210652 A1 | 7/2014 | Bartnik et al. | |
| 2014/0369450 A1 | 12/2014 | Leyh et al. | |
| 2015/0215014 A1 | 7/2015 | Chen et al. | |
| 2015/0311994 A1 | 10/2015 | Börner et al. | |
| 2015/0326296 A1 | 11/2015 | Börner et al. | |
| 2016/0173180 A1* | 6/2016 | Cheng | H04B 7/0469 375/267 |
| 2017/0214443 A1 | 7/2017 | Chen | |
| 2017/0366242 A1 | 12/2017 | Doostnejad et al. | |
| 2018/0205438 A1 | 7/2018 | Davydov et al. | |
| 2019/0223140 A1 | 7/2019 | Grossmann et al. | |
| 2019/0323855 A1 | 10/2019 | Grossmann et al. | |
| 2019/0349042 A1 | 11/2019 | Grossmann et al. | |
| 2019/0349045 A1 | 11/2019 | Grobmann et al. | |
| 2019/0364390 A1 | 11/2019 | Franke et al. | |
| 2019/0373575 A1 | 12/2019 | Grossmann et al. | |
| 2020/0059289 A1 | 2/2020 | Grossmann et al. | |

FOREIGN PATENT DOCUMENTS

| | | |
|---|---|---|
| EP | 3185454 A1 | 6/2017 |
| EP | 3185454 A4 | 8/2017 |
| EP | 3258537 A1 | 12/2017 |
| EP | 3358754 A1 | 8/2018 |
| EP | 3358756 A1 | 8/2018 |
| EP | 3185454 B1 | 8/2019 |
| EP | 3577777 A1 | 12/2019 |
| EP | 3577783 A1 | 12/2019 |
| WO | 2014/098643 A1 | 6/2014 |
| WO | 2016/054809 A1 | 4/2016 |
| WO | 2018/141868 A1 | 8/2018 |
| WO | 2018/141869 A1 | 8/2018 |
| WO | 2018/228707 A1 | 12/2018 |

OTHER PUBLICATIONS

3GPP TS 36.211 V10.7.0, "3rd Generation Partnership Project; Technical Specification Group Radio Access Network; Evolved Universal Terrestrial Radio Access (E-UTRA); Physical Channels and Modulation (Release 10)," Feb. 2013.

3GPP TR 36.897 V13.0.0, "3rd Generation Partnership Project; Technical Specification Group Radio Access Network; Study on elevation beamforming / Full-Dimension (FD) Multiple Input Multiple Output (MIMO) for LTE (Release 13)," Jun. 2015.

Buhren M. et al., "Virtual array design for array interpolation using differential geometry," In international conference on Acoustics, Speech, and Signal Processing, 2004.

Mathews, Cherian P. et al., "Eigenstructure techniques for 2-D angle estimation with uniform circular arrays." IEEE Transactions on signal processing, vol. 42, No. 9, pp. 2395-2407, 1994.

Florian Roemer et al., "Polarimetric Compressive Sensing Based DOA Estimation," Workshop on Smart Antennas, Mar. 2014.

M. Landmann et al., "Common Pitfalls in Multidimensional High Resolution Channel Parameter Estimation", IEEE Digital Signal Processing Workshop, Sep. 2009.

* cited by examiner

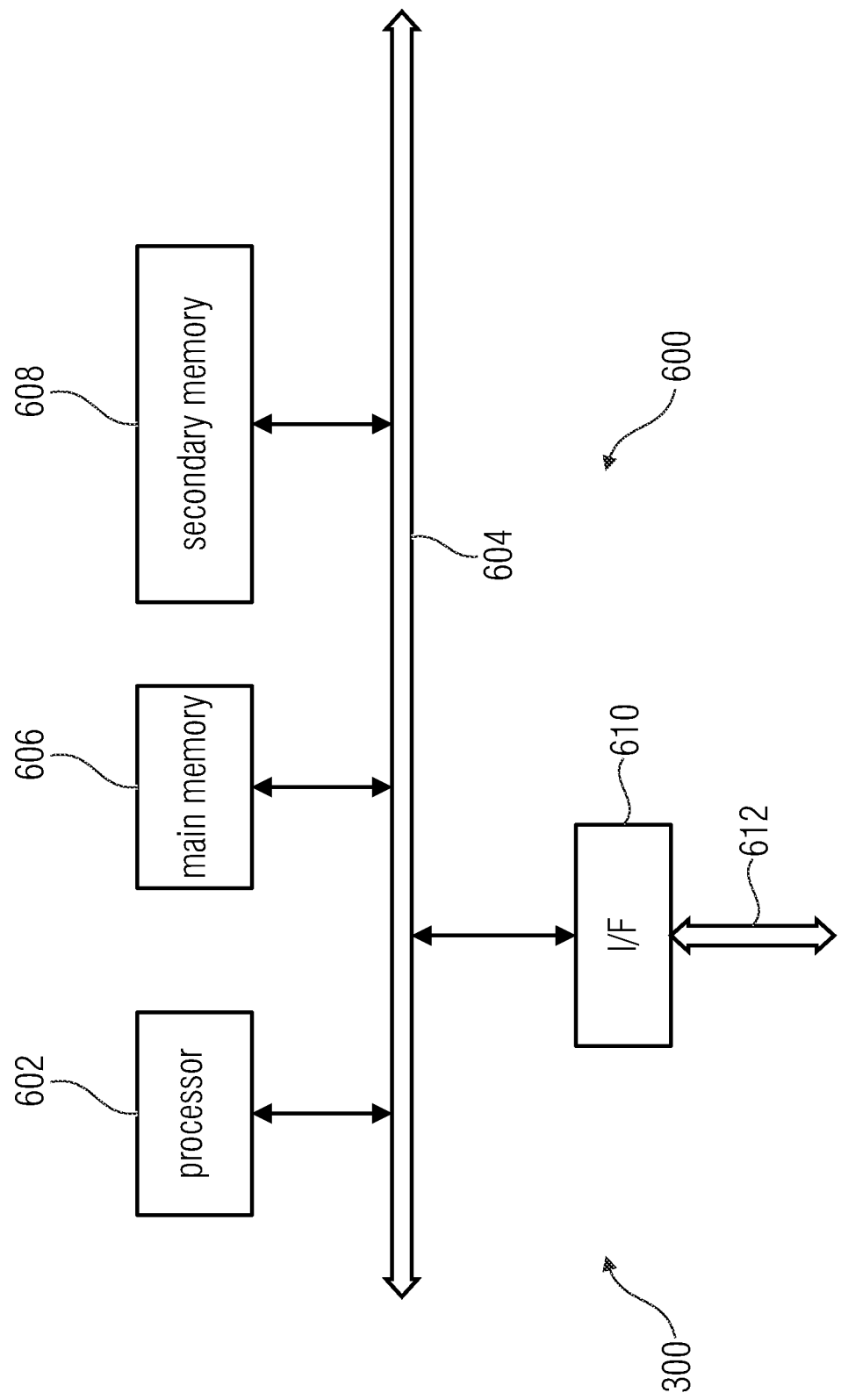

ANTENNA ARRAY CODEBOOK WITH BEAMFORMING COEFFICIENTS ADAPTED TO AN ARBITRARY ANTENNA RESPONSE OF THE ANTENNA ARRAY

CROSS-REFERENCE TO RELATED APPLICATIONS

This application is a continuation of copending International Application No. PCT/EP2019/067418, filed Jun. 28, 2019, which is incorporated herein by reference in its entirety, and additionally claims priority from European Application No. 18180856.9, filed Jun. 29, 2018, which is also incorporated herein by reference in its entirety.

BACKGROUND OF THE INVENTION

The present invention concerns the field of wireless communication systems, such as a mobile communication network. Embodiments of the present invention relate to a multi-antenna technique using a precoder and a codebook with beamforming coefficients adapted to an arbitrary antenna response of a transmitter array. Further embodiments relate to a design of a polarimetric codebook that may be adapted to a 3D antenna response of the transmitter or receiver array, e.g., a 2D DFT codebook for a polarimetric antenna array response. At the receiver, the codebook may be used for a direction estimation.

FIG. 1 is a schematic representation of an example of the wireless network 100 or wireless network infrastructure of the wireless communication system of FIG. 1. The wireless network 100 may include a plurality of base stations $eNB_1$ to $eNB_5$, each serving a specific area surrounding the base station schematically represented by the respective cells $102_1$ to $102_5$. The base stations are provided to serve users within a cell. A user may be a stationary device or a mobile device. Further, the wireless communication system may be accessed by IoT devices which connect to a base station or to a user. IoT devices may include physical devices, vehicles, buildings and other items having embedded therein electronics, software, sensors, actuators, or the like as well as network connectivity that enable these devices to collect and exchange data across an existing network infrastructure. FIG. 2 shows an exemplary view of only five cells, however, the wireless communication system may include more such cells. FIG. 1 shows two users UE1 and UE2, also referred to as user equipment (UE), that are in cell $102_2$ and that are served by base station $eNB_2$. Another user $UE_3$ is shown in cell $102_4$ which is served by base station $eNB_4$. The arrows $104_1$, $104_2$ and $104_3$ schematically represent uplink/downlink connections for transmitting data from a user $UE_1$, $UE_2$ and $UE_3$ to the base stations $eNB_2$, $eNB_4$ or for transmitting data from the base stations $eNB_2$, $eNB_4$ to the users $UE_1$, $UE_2$, $UE_3$. Further, FIG. 1 shows two IoT devices $106_1$ and $106_2$ in cell $102_4$, which may be stationary or mobile devices. The IoT device $106_1$ accesses the wireless communication system via the base station $eNB_4$ to receive and transmit data as schematically represented by arrow $108_1$. The IoT device $106_2$ accesses the wireless communication system via the user $UE_3$ as is schematically represented by arrow $108_2$.

The wireless communication system may be any single-tone or multicarrier system based on frequency-division multiplexing, like the orthogonal frequency-division multiplexing (OFDM) system, the orthogonal frequency-division multiple access (OFDMA) system defined by the LTE standard, or any other IFFT-based signal with or without CP, e.g. DFT-s-OFDM. Other waveforms, like non-orthogonal waveforms for multiple access, e.g. filter-bank multicarrier (FBMC), generalized frequency division multiplexing (GFDM) or universal filtered multi carrier (UFMC), may be used.

For data transmission, a physical resource grid may be used. The physical resource grid may comprise a set of resource elements to which various physical channels and physical signals are mapped. For example, the physical channels may include the physical downlink and uplink shared channels (PDSCH, PUSCH) carrying user specific data, also referred to as downlink and uplink payload data, the physical broadcast channel (PBCH) carrying for example a master information block (MIB) and a system information block (SIB), the physical downlink control channel (PDCCH) carrying for example the downlink control information (DCI), etc. For the uplink, the physical channels may further include the physical random access channel (PRACH or RACH) used by UEs for accessing the network once a UE synchronized and obtained the MIB and SIB. The physical signals may comprise reference signals (RS), synchronization signals and the like. The resource grid may comprise a frame having a certain duration, e.g. a frame length of 10 milliseconds, in the time domain and having a given bandwidth in the frequency domain. The frame may have a certain number of subframes of predefined length, e.g., 2 subframes with a length of 1 millisecond. Each subframe may include two slots of 6 or 7 OFDM symbols depending on the cyclic prefix (CP) length. The PDCCH may be defined by a pre-defined number of OFDM symbols per slot. For example, the resource elements of the first three symbols may be mapped to the PDCCH.

In a wireless communication system like the one depicted schematically in FIG. 1, multi-antenna techniques may be used, e.g., in accordance with LTE, to improve user data rates, link reliability, cell coverage and network capacity. To support multi-stream or multi-layer transmissions, linear precoding is used in the physical layer of the communication system. Linear precoding is performed by a precoder matrix which maps layers of data to antenna ports. The precoding may be seen as a generalization of beamforming, which is a technique to spatially direct/focus data transmission towards an intended receiver.

In the following the downlink (DL) transmission in a mobile multiple input multiple output communication system will be considered, i.e., the communication link carrying data traffic from a base station (eNodeB) to a mobile user equipment (UE). Considering a base station (eNodeB) with $N_{Tx}$ antennas and a mobile user equipment (UE), with $N_{Rx}$ antennas, the symbols received at a particular instant of time in a DL transmission at the UE $y \in \mathbb{C}^{N_{Rx} \times 1}$, may be written as $$y = HFs + n \quad (1)$$

where $H \in \mathbb{C}^{N_{Rx} \times N_{Tx}}$ denotes the channel matrix, $F \mathbb{C}^{N_{Tx} \times N_s}$ represents the precoder matrix at the eNodeB, $n \in \mathbb{C}^{N_{Rx} \times 1}$ is the additive noise at the receiver, $s \in \mathbb{C}^{N_s \times 1}$ is the data vector transmitted by the eNodeB which has to be decoded by the UE, and $N_s$ denotes the number of data streams transmitted.

The precoder matrix that has to be used at the eNodeB to map the data $s \in \mathbb{C}^{N_s 1}$ to the $N_{Tx}$ antenna ports is decided by solving an optimization problem that is based on the instantaneous channel information $H \in \mathbb{C}^{N_{Rx} \times N_{Tx}}$. In a closed-loop mode of communication, the UE estimates the state of the channel and transmits the reports, channel state information (CSI), to the eNodeB via a feedback channel in the uplink (the communication link carrying traffic from the UE to the eNodeB) so that the eNodeB may determine the precoding matrix (see reference [1]). There are also occasions when multiple-layer transmissions are performed without feedback from the UE to determine the precoding matrices. Such a mode of communication is called 'open-loop' and the eNodeB makes use of signal diversity and spatial multiplexing to transmit information (see reference [1]).

In the following, the closed-loop DL transmission mode will be considered. The CSI feedback sent to the eNodeB in the closed-loop mode may be of two different types: implicit and explicit. FIG. 2 shows a block-based model of the MIMO DL transmission using codebook-based-precoding in accordance with LTE release 8. FIG. 2 shows schematically the base station 200, the user equipment 300 and the channel 400, like a radio channel for a wireless data communication between the base station 200 and the user equipment 300. The base station includes an antenna array 202 having a plurality of antennas or antenna elements, and a precoder 204 receiving a data vector 206 and a precoder matrix F from a codebook 208. The channel 400 may be described by the channel matrix 402. The user equipment 300 receives the data vector 302 via an antenna or an antenna array 304 having a plurality of antennas or antenna elements. Further, a feedback channel 500 between the user equipment 300 and the base station 200 is shown for transmitting feedback information.

In the case of an implicit feedback, the CSI transmitted by the UE 300 over the feedback channel 500 includes the rank index (RI), the precoding matrix index (PMI) and the channel quality index (CQI) allowing, at the eNodeB 200, deciding the precoding matrix, and the modulation order and coding scheme (MCS) of the symbols transmitted. The PMI and the RI are used to determine the precoding matrix from a predefined set of matrices Si called 'codebook' 208. The codebook 208, e.g., in accordance with LTE, may be a look-up table with matrices in each entry of the table, and the PMI and RI from the UE decide which row and column of the table the optimal precoder matrix is obtained from.

The codebook designs in DL transmissions may be specific to the number of antenna ports used for the transmission. For example, when two ports are used for the transmission, the codebook entries come from the columns of 2×2 unitary matrices with constant modulus entries (see reference [2]). For a 4-port transmission, the columns of householder matrices $B_n = I_4 - 2u_n u_n^H / u_n^H u_n$ may be used for the precoder $F \in \mathbb{C}^{N_{Tx} \times N_s}$ ($N_s \leq 4$ in this case), where $u_n \in \mathbb{C}^{N_{Tx} \times 1}$ is a vector with unit modulus entries, with n denoting the codebook index (see reference [2]).

With explicit CSI feedback, there is no use of a codebook to determine the precoder. The coefficients of the precoder matrix are transmitted explicitly by the UE. Alternatively, the coefficients of the instantaneous channel matrix may be transmitted, from which the precoder is determined by the eNodeB.

The design and optimization of the precoder 204 and the codebook 208 may be performed for eNodeBs equipped with 1-dimensional Uniform Linear Arrays (ULAs) or 2-dimensional Uniform Planar Arrays (UPAs) having a fixed down-tilt. These antenna arrays 202 allow controlling the radio wave in the horizontal (azimuth) direction so that azimuth-only beamforming at the eNodeB 200 is possible. In accordance with other examples, the design of the codebook 208 is extended to support UPAs for transmit beamforming on both vertical (elevation) and horizontal (azimuth) directions, which is also referred to as full-dimension (FD) MIMO (see reference [3]).

The codebook 208 in FD-MIMO is designed based on the array response of an ideal UPA. The response of an antenna array, also referred to as 'array response vectors', with $N_{Tx}$ antenna ports is a complex-valued vector of size $N_{Tx} \times 1$ which contains the amplitude gain and the (relative) phase shift induced or obtained at each antenna port of the antenna array 202 for a wavefront incident from a certain direction. The response of an array is usually represented as a function of angle of arrival or angle or departure. The codebook 208 used in the case of massive antenna arrays such as the ones FD-MIMO, is a set of beamforming weights that forms spatially separated electromagnetic transmit/receive beams using the array response vectors of the array. The beamforming weights of the array are amplitude gains and phase adjustments that are applied to the signal fed to the antennas (or the signal received from the antennas) to transmit (or obtain) a radiation towards (or from) a particular direction. The components of the precoder matrix are obtained from the codebook of the array, and the PMI and the RI are used to 'read' the codebook and obtain the precoder.

The array steering vectors of an ideal UPA having identical antennas with ideal antenna placement, e.g., antennas placed with infinite precision as dictated by the geometry, and omnidirectional radiation patterns may be described by the columns of a 2-D Discrete Fourier Transform (DFT) matrix (see reference [4]). Hence, for the codebook of 2D UPAs 2D-DFT-based matrices may be used. 2D-DFT-based matrices are defined for a scalable number of antenna ports, e.g., up to 32 antenna ports per polarization/antenna orientation, or 64 antenna ports in co-polarized antenna arrays (see reference [3]).

The precoder matrices used in FD-MIMO may have a dual-stage structure: $F = F_1 F_2$. Here, the matrix $F_1$ contains the beamforming vectors which are defined by a 2D-DFT codebook, i.e., the matrix $F_1$ contains the beamforming weights applied to each antenna port of the array to direct the radiation towards a particular direction. The matrix $F_2$ contains coefficients that select and/or linearly combine the 2D-DFT beams in the matrix $F_1$ to obtain a desired overall beam pattern. The matrix $F_2$ may also be used to perform co-phasing between different antenna orientations/polarization groups of the array (see reference [3]).

In massive antenna arrays, multiple antennas that are oriented in different directions may be placed at a particular position in the array, i.e., there are P antenna ports at each position). Each of the antennas is sensitive to a particular polarization of the transmitted or received wavefront. As the orientation of the antenna defines the polarization direction of the wavefront it is sensitive to, the terms 'antenna orientations' and 'antenna polarizations' may be used interchangeably. However, in the following 'antenna orientation(s)' is used wherever applicable instead of 'antenna polarization(s)' so as to avoid confusion with wave polarizations that are also described introduced later. Considering a generic geometry of the array, the components of the FD-MIMO-type two-stage precoder matrix for an array with $N_T$ antenna ports per orientation, and P different antenna orientations among the antennas are, as shown, in the following equation:

$$F = F_1 F_2 = \begin{bmatrix} s_1^1 & s_2^1 & \cdots & s_D^1 & \cdots & & 0 \\ \vdots & & \ddots & & & & \vdots \\ 0 & & & \cdots & s_1^P & s_2^P & \cdots & s_D^P \end{bmatrix} [c^1 \cdots c^{D'}]. \quad (2)$$

The matrix $F_1 \in \mathbb{C}^{N_{Tx} \cdot P \times D \cdot P}$ has a block-diagonal structure with the array steering vectors for antennas with a specific orientation in each block. Each of the vectors $s_d^p \in \mathbb{C}^{N_{Tx} \times 1}$, $d=1, 2, \ldots, D$ and $p=1, 2, \ldots, P$ in $F_1$ corresponds to a beamforming vector that steers the beam along certain d-th direction selected from D directions, using the antennas oriented in the p-th direction. The possible vectors for $s_d^p \in \mathbb{C}^{N_{Tx} \times 1}$ are the columns contained in the so-called 'codebook' matrix of the array, which contains the steering vectors for various angles of radiation.

The vectors $c^d$, $d=1, 2, \ldots, D'$ in $F_2 \in \mathbb{C}^{D \cdot P \times D'}$ are used to perform the beam selection or perform a linear combination of beams. The combination/co-phasing of the beams may be performed within and across different antenna polarizations in this matrix. The variable D' denotes the number of beams formed effectively.

To illustrate the use of the combining matrix $F_2$, the types of vectors used in the matrix are provided along with the purpose they satisfy.

For a rank-1 transmission and Type-I reporting, $F_2(s)$ is given for dual-polarized antenna arrays (P=2) by [7]

$$F_2(s) = \begin{bmatrix} e_u \\ e^{j\delta_1} e_u \end{bmatrix} \in \mathbb{C}^{U \cdot 2 \times 1}, \quad (3)$$

where $e_u \in \mathbb{C}^{U \times 1}$, $u=1, 2, \ldots, U$ contains zeros at all positions except the $u_{th}$ position. Such a definition of $e_u$ selects the $u_{th}$ vector for each polarization and combines them across different polarizations. Furthermore, $\delta_1$ is a quantized phase adjustment for the second polarization.

For a rank-1 transmission and Type-II reporting, $F_2(s)$ is given for dual-polarized antenna arrays (P=2) by [7]

$$F_2(s) = \begin{bmatrix} e^{j\delta_1} p_1 \\ \vdots \\ e^{j\delta_{2U}} p_{2U} \end{bmatrix} \in \mathbb{C}^{U \cdot 2 \times 1} \quad (4)$$

where the quantized values $p_u$ and $\delta_u$, $u=1, 2, \ldots, 2U$ are the amplitude and phase combing coefficients, respectively.

For rank-R transmission, $F_2(s)$ contains R vectors, where the entries of each vector are chosen to combine single or multiple beams within each polarization and/or combining them across different polarizations.

The 2D-DFT-based codebook design used in FD-MIMO is advantageous as the overall codebook may be divided into horizontal and vertical codebooks allowing for separate azimuth and elevation precoding, and as separate feedback information is delivered to the eNodeB for the azimuth and elevation domains. Further, the 2D-DFT-based codebook for FD-MIMO allows describing the array steering vectors of an ideal UPA by the columns of the 2D-DFT matrix (see reference [4]).

While a 2D DFT based codebook may be used as a codebook for uniform rectangular antenna arrays (URAs), since the antenna responses of the URA may be represented by an oversampled DFT basis vectors, a 2D-DFT based codebook may not be used for an arbitrary shaped antenna array as this may result in undesired directional beam patterns. In other words, while a specific codebook for one antenna array may be used for controlling a specific antenna array (different from the one antenna array), this specific codebook may not be suited for controlling another or arbitrary antenna array. Thus, to achieve an accurate beamforming and/or null steering for a realistic arbitrary antenna array at the transmitter, the codebook has to be adapted to the real or measured antenna array response of the transmitter. This means that different codebooks need to be designed for the different antenna arrays used. However, such antenna array-dependent codebook designs are not desired as the codebooks are also dependent on the antenna configuration, such as the number of antenna ports, or an orientation of the antennas in the antenna array.

US 2016/173180 A1 describes systems and methods for a two-dimensional discrete Fourier transform based codebook for elevation beamforming. The codebook supports single stream codewords and multistream codewords. The two-dimensional discrete Fourier transform based codebook is generated by stacking the columns of the matrix product of two discrete Fourier transform codebook matrices. The codebook size may be flexibly designed based on the used beam resolution in azimuth and elevation. A best codebook index is selected from the generated two-dimensional discrete Fourier transform based codebook. The selected codebook index is provided in a channel state information report. The channel state information report is transmitted to a base station.

It is an object of the present invention to provide an approach which avoids the need to design different codebooks for different antenna arrays used in respective transmitters and which achieves an accurate beamforming and/or null steering for an actual antenna array used at a transmitter.

SUMMARY

According to an embodiment, a receiver may have: an antenna for a wireless communication with a transmitter; and a signal processor to receive and process a radio signal received at the antenna via a radio channel; wherein the receiver is configured to construct a codebook including a plurality of sets of beamforming weights for a plurality of directions, the beamforming weights in the codebook being based on a first antenna array response matrix of a transmitter antenna array, and the transmitter selecting a set of beamforming weights from the codebook to form by the transmitter antenna array a transmit/receive beam pointing in a selected direction, wherein the receiver is configured to calculate one or more characteristic matrices based on a model of the transmitter antenna array using (a) received position data of antenna elements of the transmitter antenna array and a preferred polarization of each antenna element, and/or (b) structural and/or geometrical data of the transmitter antenna array; wherein the receiver is configured to construct the codebook using a second antenna array response matrix and the one or more calculated characteristic matrices, and wherein the first antenna array response matrix contains, for a plurality of directions, the first array response vectors of the transmitter antenna array, the second antenna array response matrix contains, for one or more of the plurality of directions, the second array response vectors of another antenna array, the other antenna array being different from the transmitter antenna array, and the one or more characteristic matrices describing one or more characteristics of the transmitter antenna array, and wherein the first antenna array response matrix is modeled using the second antenna array response matrix and the one or more characteristic matrices, each of the first array response vectors being a product of a characteristic matrix and a corresponding second array response vectors.

According to another embodiment, a wireless communication network may have: a transmitter; and one or more inventive receivers as mentioned above.

According to another embodiment, a method may have the steps of: receiving and processing, at a receiver having an antenna for a wireless communication with a transmitter, a radio signal received at the antenna via a radio channel; calculating, at the receiver, one or more characteristic matrices based on a model of a transmitter antenna array of the transmitter using (a) received position data of antenna elements of the transmitter antenna array and a preferred polarization of each antenna element, and/or (b) structural and/or geometrical data of the transmitter antenna array; and constructing a codebook at the receiver, the codebook including a plurality of sets of beamforming weights for a plurality of directions, the beamforming weights in the codebook being based on a first antenna array response matrix of the transmitter antenna array, and the transmitter selecting a set of beamforming weights from the codebook to form by the transmitter antenna array a transmit/receive beam pointing in a selected direction, wherein the codebook is constructed using a second antenna array response matrix and the one or more calculated characteristic matrices, wherein the first antenna array response matrix contains, for a plurality of directions, first array response vectors of the transmitter antenna array, the second antenna array response matrix contains, for one or more of the plurality of directions, second array response vectors of another antenna array, the other antenna array being different from the transmitter antenna array, and the one or more characteristic matrices describing one or more characteristics of the transmitter antenna array, and wherein the first antenna array response matrix is modeled using the second antenna array response matrix and the one or more characteristic matrices, each of the first array response vectors being a product of a characteristic matrix and a corresponding second array response vectors.

Another embodiment may have a non-transitory digital storage medium having stored thereon a computer program for performing a method having the steps of: receiving and processing, at a receiver having an antenna for a wireless communication with a transmitter, a radio signal received at the antenna via a radio channel; calculating, at the receiver, one or more characteristic matrices based on a model of a transmitter antenna array of the transmitter using (a) received position data of antenna elements of the transmitter antenna array and a preferred polarization of each antenna element, and/or (b) structural and/or geometrical data of the transmitter antenna array; and constructing a codebook at the receiver, the codebook including a plurality of sets of beamforming weights for a plurality of directions, the beamforming weights in the codebook being based on a first antenna array response matrix of the transmitter antenna array, and the transmitter selecting a set of beamforming weights from the codebook to form by the transmitter antenna array a transmit/receive beam pointing in a selected direction, wherein the codebook is constructed using a second antenna array response matrix and the one or more calculated characteristic matrices, wherein the first antenna array response matrix contains, for a plurality of directions, first array response vectors of the transmitter antenna array, the second antenna array response matrix contains, for one or more of the plurality of directions, second array response vectors of another antenna array, the other antenna array being different from the transmitter antenna array, and the one or more characteristic matrices describing one or more characteristics of the transmitter antenna array, and wherein the first antenna array response matrix is modeled using the second antenna array response matrix and the one or more characteristic matrices, each of the first array response vectors being a product of a characteristic matrix and a corresponding second array response vectors, when said computer program is run by a computer

BRIEF DESCRIPTION OF THE DRAWINGS

Embodiments of the present invention are now described in further detail with reference to the accompanying drawings, in which:

FIG. 7 illustrates an example of a computer system on which units or modules as well as the steps of the methods described in accordance with the inventive approach may execute.

DETAILED DESCRIPTION OF THE INVENTION

Figure 1:
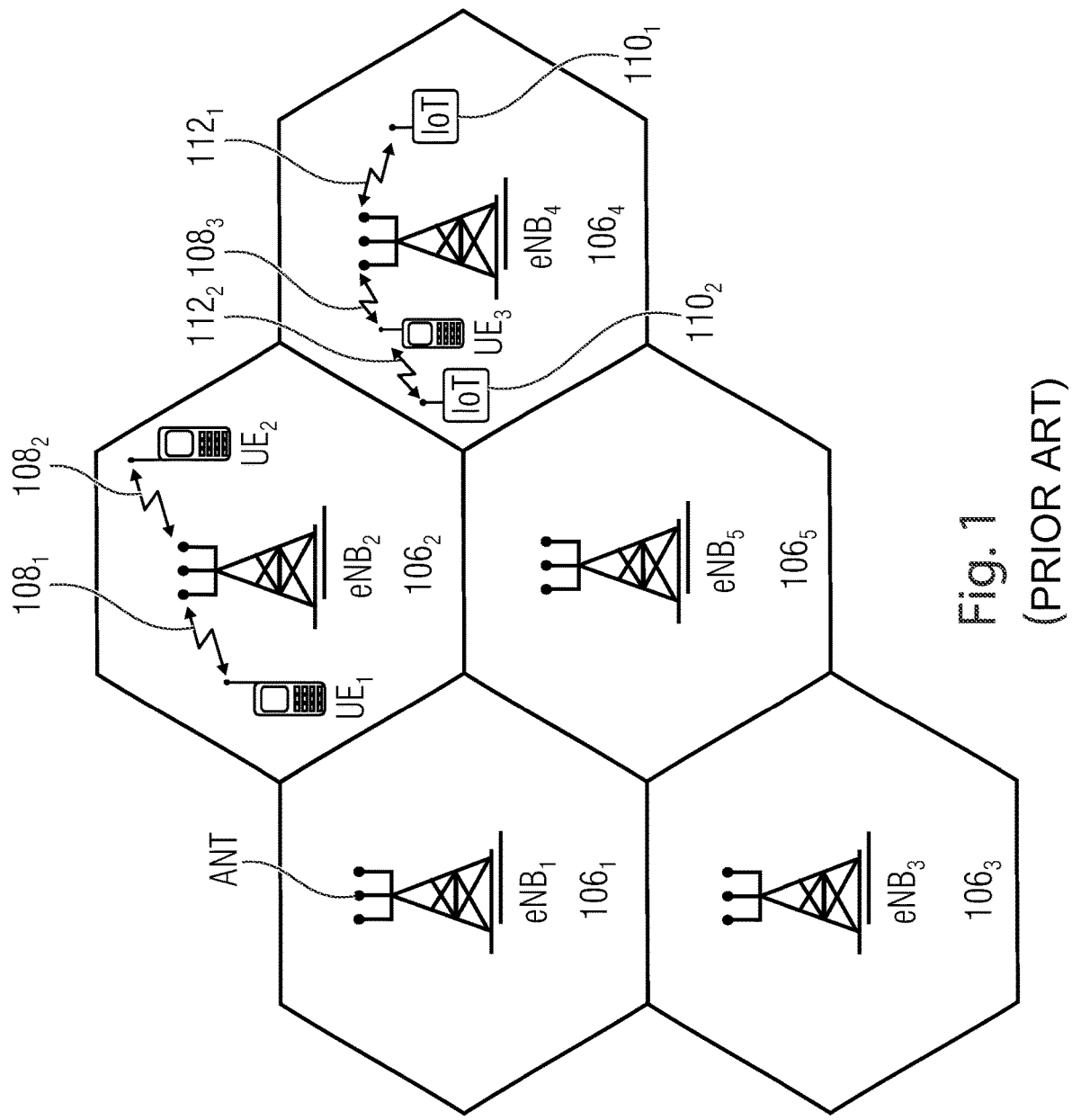
FIG. 1 shows a schematic representation of a system for implementing different services using the concept of network slices.

In the following, embodiments of the present invention are described in further detail with reference to the enclosed drawings in which elements having the same or similar function are referenced by the same reference signs.

In accordance with embodiments of the present invention in a wireless communication system an antenna array of a transmitter is controlled by a codebook that has been established for a specific antenna array that is different from the transmitter's antenna array. The transmitter's antenna array may be an antenna array having an arbitrary configuration, e.g. the transmitter's antenna array may include a 1-dimensional antenna array, or a 2-dimensional antenna array, or a 3-dimensional antenna array of any array configuration. The specific codebook, e.g. a 2D DFT based codebook, is adapted to the actual or real antenna array of the transmitter by one or more characteristic matrices describing the configuration or nature of the transmitter's antenna array. Thus, in accordance with the inventive approach a specific codebook for one antenna array, which is different from the antenna array of the transmitter, is adapted for controlling the transmitter's antenna array so as to obtain the desired directional beam patterns.

In accordance with embodiments, a transmitter, e.g. a base station serving one or more UEs or a UE communicating with a base station, is provided including an antenna array having a plurality of antennas for a wireless communication with one or more receivers and a precoder connected to the antenna array, the precoder to apply a set of beamforming weights to the antenna array, the set of beamforming weights selected from a codebook to form by the antenna array one or more transmit/receive beams or nulls pointing in selected directions. The codebook includes a plurality of sets of beamforming weights for a plurality of directions. The beamforming weights in the codebook are based on a first antenna array response matrix, the first antenna array response matrix defined by a second antenna array response matrix and one or more characteristic matrices. The first antenna array response matrix contains, for a plurality of directions, first array response vectors of the antenna array, the second antenna array response matrix contains, for one or more of the plurality of directions, second array response vectors of another antenna array, the other antenna array being different from the antenna array, and the one or more characteristic matrices describing one or more characteristics of the antenna array.

In the present invention, when referring to one or more of the plurality of directions, this means one of the plurality of directions, two or more of the plurality of directions, or all of the plurality of directions.

In other words, according to the present invention, the array response matrix of the transmitter's antenna array, which may have an arbitrary configuration, is based on a known array response matrix of another antenna array (different from the transmitter's antenna array) that is adapted to the actual or real world implementation of the transmitter's antenna array. This yields the array response for the transmitter's antenna array, which forms the basis for the precoder to be used by the transmitter. The adaptation uses the one or more characteristic matrices, which describe one or more of the characteristics of the antenna array of the transmitter, e.g. on the basis of a model of the transmitter's antenna array, a measurement of the transmitter's antenna array or a combination thereof.

In accordance with specific embodiments, a 2D DFT based codebook is used as a basis for the codebook for the transmitter's antenna array. The transmitter's antenna array may be an arbitrary 3D shaped antenna array, e.g., a stacked uniform circular array. In order to achieve an accurate beamforming and/or null steering for a realistic arbitrary antenna array at the transmitter, the codebook may be adapted to a real or measured antenna array response of the transmitter, e.g., to the real or measured full-polarimetric 3D antenna array response of the transmitter.

The one or more characteristic matrices may be based on a model of the antenna array or on a measured antenna array response matrix containing, for some or all of the plurality of directions, measured array response vectors determined from a measurement of the antenna array. In accordance with embodiments, the model of the antenna array or the measurement of the antenna array may consider a directional and non-identical nature of one or more of the respective antennas in the antenna array, and/or an electromagnetic coupling between the respective antennas in the antenna array, and/or other practical imperfections in the antenna array. In accordance with further embodiments, the model of the antenna array or the measurement of the antenna array may describe one or more radiation characteristics of one or more of the antennas of the antenna array, the radiation characteristics including one or more of a phase and an amplitude due to a position of an antenna in the antenna array, and/or a coupling imbalance, and/or a manufacturing imbalance.

In accordance with further embodiments, the codebook may be obtained from a first codebook modified or adapted using the one or more characteristic matrices. The first codebook is defined by the second array response vectors of the second antenna array response matrix. An advantage of using the one or more characteristic matrices for adapting the codebook is that the information about the real antenna array at the transmitter may be provided to a receiver, e.g. a UE served by the base station, easily and without the need to transmit a huge amount of information to the UE. In accordance with embodiments, by means of the one or more characteristic matrices the information of the real implementation of the antenna array is transmitted by the base station to the UE or may be downloaded by the UE. The availability of the actual eNodeB's array characteristics at the UE helps in beam refining, channel estimation and CSI feedback. The accuracy and amount of the CSI feedback, and the accuracy of the channel estimation process heavily depend on the availability of the actual codebook (or the array response) of the eNodeB at the UE. Transmitting the adapted array response to the UE as a whole would result in transmitting a huge amount of control information. In accordance with embodiments of the invention, only characteristic matrix is transmitted, thereby reducing the control information overhead. In accordance with embodiments, in addition to the transmission of the characteristic matrices also design parameters of the codebook for the other antenna array, like the 2D DFT matrix, may be transmitted to the receiver. The receiver may then generate the needed codebook, e.g., a polarimetric 2D-DFT based codebook, defined by the received parameters and the received characteristic matrices. In accordance with further embodiments of the invention, only the structural and/or geometrical data of the transmitter antenna array or the received position data of antenna elements of the transmitter antenna array and a preferred polarization of each antenna element may be transmitted to the receiver.

The receiver may then select the best codebook vectors from the generated codebook, and feedback the selected indices of the codebooks or the selected beamforming weights to the transmitter.

Thus, embodiments provide a receiver, e.g., a UE communicating with a base station or a base station serving one or more UEs, including an antenna for a wireless communication with a transmitter, and a signal processor to receive and process a radio signal received at the antenna via a radio channel. The receiver is configured to construct a codebook including a plurality of sets of beamforming weights for a plurality of directions, the beamforming weights in the codebook being based on a first antenna array response matrix of an antenna array of the transmitter, and the transmitter selecting a set of beamforming weights from the codebook to form by the antenna array a transmit/receive beam pointing in a selected direction. The receiver is configured to construct the codebook using a second antenna array response matrix and one or more characteristic matrices received from the transmitter. The first antenna array response matrix contains, for a plurality of directions, first array response vectors of the antenna array, the second antenna array response matrix contains, for one or more of the plurality of directions, second array response vectors of another antenna array, the other antenna array being different from the transmitter's antenna array, and the one or more characteristic matrices describing one or more characteristics of the transmitter's antenna array.

In the following, the inventive approach will be described on the basis of embodiments of a DL communication in which the transmitter is the base station or eNodeB having an arbitrary 3D antenna array, and the receiver is a UE served by the eNodeB. First, embodiments using a non-polarimetric codebook will be described, followed by the description of embodiments using a polarimetric codebook.

Non-Polarimetric Codebook

The response of an arbitrary 3D antenna array having $N_{Tx}$ antenna ports may be defined by the matrix $A(\varphi, \theta) \in \mathbb{C}^{N_{Tx} \times MN}$. The matrix, also referred to as antenna array response matrix, $$A(\varphi,\theta)=[a(\varphi_1,\theta_1)a(\varphi_1,\theta_2) \ldots a(\varphi_m,\theta_n) \ldots a(\varphi_M, \theta_{N-1})a(\varphi_M,\theta_N)] \quad (7)$$

includes MN steering vectors $a(\varphi_m, \theta_n)$, also to as antenna array response vectors. The steering vectors $a(\varphi_m, \theta_n)$ include the responses from all antenna ports for the $m^{th}$ azimuth and $n^{th}$ elevation direction $$a(\varphi_m,\theta_n)=[a_1(\varphi_m,\theta_n)a_2(\varphi_m,\theta_n) \ldots a_{N_{Tx}}(\varphi_m,\theta_n)]^T \in \mathbb{C}^{N_{Tx} \times 1}, \quad (8)$$

$\forall m=1, 2, \ldots, M$ and $n=1, 2, \ldots, N$.

The parameters M and N denote the number of samples in the azimuth range $\varphi_m \in [\tilde{\varphi}_0, \tilde{\varphi}_1]$ and elevation range $\theta_n \in [\tilde{\theta}_0, \tilde{\theta}_1]$, respectively.

Step 1: Each steering vector $a(\varphi_m, \theta_n)$ of the arbitrary 3D antenna array may be written as a product of a characteristic matrix G of the antenna array and a steering vector $d(\varphi_m, \theta_n)$, $$a(\varphi_m,\theta_n)=Gd(\varphi_m,\theta_n) \quad (9)$$

If the matrix $G \in \mathbb{C}^{N_{Tx} \times Q}$ corresponds to the characteristic matrix of the array response A, the steering vector $d(\varphi_m, \theta_n)$ is given as a Kronecker product of two Vandermonde vectors $d(\varphi_m)$ and $d(\theta_n)$, $$d(\varphi_m, \theta_n) = d(\varphi_m) \otimes d(\theta_n) \in \mathbb{C}^{Q \times 1} \quad (10)$$

where $$d(\varphi_m) = \left[e^{-\frac{j(Q_1-1)}{2}\varphi_m}, \ldots, e^{-j\varphi_m}, 1, e^{j\varphi_m}, \ldots, e^{\frac{j(Q_1-1)}{2}\varphi_m}\right]^T \in \mathbb{C}^{Q_1 \times 1} \quad (11)$$

$$d(\theta_n) = \left[e^{-\frac{j(Q_2-1)}{2}\theta_n}, \ldots, e^{-j\theta_n}, 1, e^{j\theta_n}, \ldots, e^{\frac{j(Q_2-1)}{2}\theta_n}\right]^T \in \mathbb{C}^{Q_2 \times 1} \quad (12)$$

such that $Q_1 \cdot Q_2 = Q$.

By collecting MN vectors of size $Q \times 1$ defined in equation (10), the matrix $D(\varphi, \theta)$ may be defined as $$D(\varphi,\theta)=[d(\varphi_1,\theta_1)d(\varphi_1,\theta_2) \ldots d(\varphi_m,\theta_n) \ldots d(\varphi_M, \theta_{N-1})d(\varphi_M,\theta_N)] \in \mathbb{C}^{Q \times MN} \quad (13)$$

$Q_1$ and $Q_2$ denote the number of antenna ports in the horizontal (row) and vertical (columns) directions, respectively.

The $N_{Tx} \times Q$ sized non-square characteristic matrix G provide a mathematical model of the transmitter's antenna array and contain a sufficiently accurate descriptions of the antenna element radiation characteristics including phases and amplitudes due to element positions, coupling and manufacturing imbalances.

The characteristic matrix G may be computed by solving the following optimization problem $$G_{opt} = \underset{G \in \mathbb{C}^{N_{Tx} \times Q}}{\arg\min} \|A - GD\|_F^2 \quad (14)$$

One potential solution to (14) is given by the concept of the Effective Aperture Distribution Function (EADF) of the antenna array. The EADF represents the inverse Fourier transform of the array response over the azimuth range $\varphi_m \in [\tilde{\varphi}_0, \tilde{\varphi}_1]$ and elevation range $\theta_n \in [\tilde{\theta}_0, \tilde{\theta}_1]$. To calculate the EADF matrix $G_{EADF}$, the array response has to be available as discrete periodic functions with a period $2\pi$. For the q-th row of A, the element $g_{iq}$ of matrix G is given by $$g_{iq} = \frac{1}{R}\sum_{r=1}^{R} a_{ir} e^{\frac{j2\pi}{R}(r-1)(q-1)} \quad (15)$$

for $1 \leq q \leq Q$ and $i=1, \ldots, N_{Tx}$ with R=MN.

Alternatively, the characteristic matrix G may be computed by the least squares (LS) solution given by $$G_{LS}=AD^H(DD^H)^{-1} \quad (16)$$

The 2D DFT steering matrix $D(\varphi, \theta)$ may also be mapped to the array response of a "virtual" ideal URA having Q "virtual" antenna ports by introducing the angle transformations $\alpha=\sin(\varphi_m)$ and $\beta=\cos(\theta_n)$ on the Vandermonde vector shown in equations (11) and (12). Here $\alpha$ and $\beta$ represent the phases of the rectangular array in horizontal and vertical directions, respectively.

In contrast to an array interpolation as described in reference [5], or a beamspace transformation as described in reference [6], the transformation approach in equation (9) does not interpolate the steering vectors from the real array response to another array response, rather it changes the mathematical model of the real array response.

The parameter Q, specifying the dimension of the vectors in the 2D DFT matrix is a design parameter and may be chosen freely such that $N_{Tx} \ll Q$. The larger Q, the smaller is the approximation or fitting errors $\mathcal{O}(Q)$ of the transformation of the array responses $$\mathcal{O}(Q)=\|A-GD\|_F^2 \quad (17)$$

Using more samples Q to approximate the characteristic matrices increases the sizes.

At the transmitter, the characteristic matrix G and the 2D-DFT matrix D may be used to design a 2D-DFT based codebook that is adapted to the 3D antenna array response at the transmitter.

$$\Omega=\{Gd(\varphi_m,\theta_n) | \forall (m,n) \in \{1 \leq m \leq M, 1 \leq n \leq N\}\} \quad (18)$$

Step 2: The characteristic matrix G and design parameters of the 2D DFT matrix (Q, M, N) may be transmitted to the receiver side. The receiver may generate a 2D-DFT based codebook $\Omega$, defined by the parameters (Q, M, N) and the characteristic matrix G. The receiver may select the best codebook vectors from the codebook, and feedback the selected indices of the codebook or the codebook entries (beamforming weights) to the transmitter (e.g. eNodeB).

Polarimetric Codebook

In the embodiments described so far, no assumptions have been made with respect to the array geometry or the number of polarizations involved in the array, and the codebook and antenna response considerations described so far are non-polarimetric, i.e., the discussion of the array response or codebook was not discussed in the context of sensitivity of the antenna array to the polarization state of the transmitted or received wavefront. However, the present invention is not limited to such embodiments.

Although some codebook designs may be non-polarimetric, and, therefore, tend to ignore the practical aspects of the array in the design, the inventive approach in accordance with further embodiments considers the polarization-based response of the antennas as otherwise the beamforming efforts may turn out to be totally useless (see references [7] and [8]). Thus, in accordance with embodiments the responses of the antenna ports of the antenna array to the horizontal and vertical polarization of the transmitted/received wavefront are considered.

The antennas in the array may be oriented in different directions to be sensitive to wavefronts with varying polarizations. Ideally, an antenna oriented along a particular direction should respond to a wavefront polarized only along a certain direction and reject all the components polarized in any other direction. In the literature, the direction of orientation of the antennas is the same as the polarization angle the antenna responds to and, therefore, the term 'polarization of the antenna' is used in place of 'orientation of the antenna, however, herein the term 'orientation' is used when referring to antennas to avoid any confusion with the wave polarization. In practice, however, due to the non-ideality of the antennas, the antennas tend to transmit/receive components of the wavefront across multiple polarizations. Therefore, in accordance with embodiments, the response of the antennas in the array across two orthogonal polarizations of the wavefront, horizontal and vertical, is considered for the polarimetric codebook design. The terms 'horizontal and vertical' mentioned herein are the polarizations of the wavefront, and not the horizontal and vertical orientations/polarizations of the antennas (or the horizontal and vertical arrangement of the antennas in a uniform planar array in FD-MIMO, for example). There is also a specific notation used to denote the response of the antenna to a particular wave polarization: the subscript/superscript '(h)' in a matrix or vector denotes the association with the horizontal polarization of the wavefront and the subscript/superscript '(v)' denotes the association with the vertical polarization of the wavefront.

The response of an arbitrary 3D antenna array having $N_{Tx}$ antenna ports is defined by two matrices $A_{(h)}(\varphi, \theta) \in \mathbb{C}^{N_{Tx} \times MN}$ and $A_{(v)}(\varphi, \theta) \in \mathbb{C}^{N_{Tx} \times MN}$ with respect to the horizontal and vertical polarization of the transmitted/received wavefront, respectively. The matrices, also referred to as antenna array response matrices, $$A_{(h)}(\varphi,\theta)=[a_{(h)}(\varphi_1,\theta_1)a_{(h)}(\varphi_1,\theta_2) \ldots a_{(h)}(\varphi_m,\theta_n) \ldots a_{(h)}(\varphi_M,\theta_{N-1})a_{(h)}(\varphi_M,\theta_N)] \quad (19)$$

$$A_{(v)}(\varphi,\theta)=[a_{(v)}(\varphi_1,\theta_1)a_{(v)}(\varphi_1,\theta_2) \ldots a_{(v)}(\varphi_m,\theta_n) \ldots a_{(v)}(\varphi_M,\theta_{N-1})a_{(v)}(\varphi_M,\theta_N)] \quad (20)$$

include MN steering vectors $a_{(h)}(\varphi_m, \theta_n)$ and $a_{(v)}(\varphi_m, \theta_n)$ for the horizontal and vertical polarizations, respectively. The steering vectors are also referred to as antenna array response vectors. The steering vectors $a_{(h)}(\varphi_m, \theta_n)$ and $a_{(v)}(\varphi_m, \theta_n)$ include the responses from all antenna ports for the $m^{th}$ azimuth and $n^{th}$ elevation direction $$a_{(h)}(\varphi_m,\theta_n)=[a_{(h)1}(\varphi_m,\theta_n)a_{(h)2}(\varphi_m,\theta_n) \ldots a_{(h)N_{Tx}}(\varphi_m,\theta_n)]^T \in \mathbb{C}^{N_{Tx} \times 1} \quad (21)$$

$$a_{(v)}(\varphi_m,\theta_n)=[a_{(v)1}(\varphi_m,\theta_n)a_{(v)2}(\varphi_m,\theta_n) \ldots a_{(v)N_{Tx}}(\varphi_m,\theta_n)]^T \in \mathbb{C}^{N_{Tx} \times 1} \quad (22)$$

$\forall m=1, 2, \ldots, M$ and $n=1, 2, \ldots, N$.

The parameters M and N denote the number of samples in the azimuth range $\varphi_m \in [\tilde{\varphi}_0, \tilde{\varphi}_1)$ and elevation range $\theta_n \in [\tilde{\theta}_0, \tilde{\theta}_1)$, respectively.

Step 1: Each steering vector $a_{(h)}(\varphi_m, \theta_n)$ with respect to the horizontal polarization of the arbitrary 3D antenna array of the transmitter may be written as a product of a characteristic matrix $G_{(h)}$ of the antenna array and a steering vector $d(\varphi_m, \theta_n)$ $$a_{(h)}(\varphi_m,\theta_n)=G_{(h)}d(\varphi_m,\theta_n) \quad (23)$$

and, similar, each steering vector $a_{(v)}(\varphi_m, \theta_n)$ with respect to the vertical polarization may be written as $$a_{(v)}(\varphi_m,\theta_n)=G_{(v)}d(\varphi_m,\theta_n). \quad (24)$$

If the matrix $G_{(h)} \in \mathbb{C}^{N_{Tx} \times Q}$ corresponds to the characteristic matrix of the array response $A_{(h)}$, the steering vector $d(\varphi_m, \theta_n)$ is given as a Kronecker product of two Vandermonde vectors $d(\varphi_m)$ and $d(\theta_n)$, $$d(\varphi_m, \theta_n) = d(\varphi_m) \otimes d(\theta_n) \in \mathbb{C}^{Q \times 1} \quad (25)$$

where $$d(\varphi_m) = \left[ e^{-\frac{j(Q_1-1)}{2}\varphi_m}, \ldots, e^{-j\varphi_m}, 1, e^{j\varphi_m}, \ldots, e^{\frac{j(Q_1-1)}{2}\varphi_m} \right]^T \in \mathbb{C}^{Q_1 \times 1} \quad (26)$$

$$d(\theta_n) = \left[ e^{-\frac{j(Q_2-1)}{2}\theta_n}, \ldots, e^{-j\theta_n}, 1, e^{j\theta_n}, \ldots, e^{\frac{j(Q_2-1)}{2}\theta_n} \right]^T \in \mathbb{C}^{Q_2 \times 1} \quad (27)$$

such that $Q_1 \cdot Q_2 = Q$

By collecting MN vectors of size $Q \times 1$ defined in equation (25), the matrix $D(\varphi, \theta)$ may be defined as $$D(\varphi,\theta)=[d(\varphi_1,\theta_1)d(\varphi_1,\theta_2) \ldots d(\varphi_m,\theta_n) \ldots d(\varphi_M,\theta_{N-1})d(\varphi_M,\theta_N)] \in \mathbb{C}^{Q \times MN} \quad (28)$$

$Q_1$ and $Q_2$ denote the number of antenna ports in the horizontal (row) and vertical (columns) directions, respectively.

The $N_{Tx} \times Q$ sized non-square characteristic matrices $G_{(h)}$ and $G_{(v)}$ provide a mathematical model of the antenna array and contain a sufficiently accurate descriptions of the antenna element radiation characteristics including phases and amplitudes due to element positions, coupling and manufacturing imbalances with respect to the two polarizations.

The characteristic matrices $G_{(h)}$ and $G_{(v)}$ may be computed by solving the following optimization problem $$\overline{G}_{opt} = \underset{\overline{G} \in \mathbb{C}^{N_{Tx} \cdot 2 \times Q}}{\operatorname{argmin}} \|\overline{A} - \overline{G}D\|_F^2 \quad (29)$$

where $\overline{A} = \begin{bmatrix} A_{(h)} \\ A_{(v)} \end{bmatrix} \in \mathbb{C}^{N_{Tx} \cdot 2 \times MN}$, $\overline{G} = \begin{bmatrix} G_{(h)} \\ G_{(v)} \end{bmatrix} \in \mathbb{C}^{N_{Tx} \cdot 2 \times Q}$ and $\overline{G}_{opt}$ is the solution to the optimization problem. One potential solution to equation (29) is given by the concept of the Effective Aperture Distribution Function (EADF) of the antenna array. The EADF represents the inverse Fourier transform of the array response over the azimuth range $\varphi_m \in [\tilde{\varphi}_0, \tilde{\varphi}_1)$ and elevation range $\theta_n \in [\tilde{\theta}_0, \tilde{\theta}_1)$. To calculate the EADF matrices $G_{(h)EADF}$ and $G_{(v)EADF}$, the array response has to be available as discrete periodic functions with a period $2\pi$ in the azimuth and the elevation, respectively. For the q-th row of $A_{(h)}$, the element $g_{(h)iq}$ of matrix $G_{(h)}$ is given by $$g_{(h)iq} = \frac{1}{R} \sum_{r=1}^{R} a_{(h)ir} e^{\frac{j2\pi}{R}(r-1)(q-1)} \quad (30)$$

for $1 \leq q \leq Q$ and $i=1, \ldots, N_{Tx}$ with $R=MN$.

Similarly, the element $g_{(v)iq}$ of matrix $G_{(v)}$ is given by $$g_{(v)iq} = \frac{1}{R}\sum_{r=1}^{R} a_{(v)ir} e^{\frac{j2\pi}{R}(r-1)(q-1)} \qquad (31)$$

Alternatively, the characteristic matrices $G_{(h)}$ and $G_{(v)}$ may also be computed by the least squares (LS) solution given by $$\overline{G}_{LS} = \overline{A}D^H(DD^H)^{-1} \qquad (32)$$

where $\overline{G}_{LS} = \begin{bmatrix} G_{(h)LS} \\ G_{(v)LS} \end{bmatrix} \in \mathbb{C}^{N_{Tx}\cdot 2\times Q}$, such that Q<MN for the inverse to exist.

It is noted that the solutions obtained by the EADF in equations (30) and (31) and by the LS approach in equation (32) may be identical when the angles in equations (21) and (22) are chosen such that D corresponds to a 2D DFT matrix.

Using the transformation approach in equations (23) and (24), the array responses $A_{(h)}(\varphi, \theta)$ and $A_{(v)}(\varphi, \theta)$ are transformed to a new array response $D(\varphi, \theta)$ that is given by a 2D DFT matrix.

The new 2D DFT steering matrix $D(\varphi, \theta)$ may also be mapped to the array response of a "virtual" ideal URA having Q "virtual" antenna ports by introducing angle transformations $\alpha=\sin(\varphi_m)$ and $\beta=\cos(\theta_n)$ on the Vandermonde vectors shown in equations (26) and (27). $\alpha$ and $\beta$ represent the phases of the rectangular array in horizontal and vertical directions, respectively.

In contrast to the array interpolation described in reference [5], or to the beamspace transformation described in reference [6], the transformation approach in equations (23) and (24) does not interpolate the steering vectors from the real array response to another array response, rather it changes the mathematical model of the real array response.

The parameter Q, specifying the dimension of the vectors in the 2D DFT matrix is a design parameter and may be chosen freely such that $N_{Tx}\ll Q$. The larger Q, the smaller is the approximation or fitting errors $\mathcal{O}_{(h)}(Q)$ or $\mathcal{O}_{(v)}(Q)$ of the transformation of the array responses $$\mathcal{O}_{(h)}(Q) = \|A_{(h)} - G_{(h)}D\|_F^2 \qquad (33)$$

$$\mathcal{O}_{(v)}(Q) = \|A_{(v)} - G_{(v)}D\|_F^2 \qquad (34)$$

Using more samples Q to approximate the characteristic matrices may increase the sizes.

Design of Polarimetric Codebook ($\Omega_{(h)}$, $\Omega_{(v)}$)

The characteristic matrices $G_{(h)}$ and $G_{(v)}$ and the 2D-DFT matrix D may be used to design a 2D-DFT based codebook that is adapted to the polarimetric 3D antenna array response at the transmitter. The polarimetric codebook includes the two sub-codebooks $\Omega_{(h)}$ and $\Omega_{(v)}$ with respect to the horizontal and vertical polarization, respectively $$\Omega_{(h)} = \{G_{(h)}d(\varphi_m,\theta_n) | \forall (m,n) \in \{1 \le m \le M, 1 \le n \le N\}\} \qquad (35)$$

$$\Omega_{(v)} = \{G_{(v)}d(\varphi_m,\theta_n) | \forall (m,n) \in \{1 \le m \le M, 1 \le n \le N\}\} \qquad (36)$$

where, the sub-codebooks $\Omega_{(h)}$ and $\Omega_{(v)}$ are defined over a total of MN points in the angular range for M points in the azimuth and N points in the elevation with a resolution of $$\frac{\varphi_1 - \varphi_0}{M}$$

in the azimuth and $$\frac{\theta_1 - \theta_0}{N}$$

in the elevation.

The corresponding precoders used at the transmitter are then based on subsets of vectors of $\Omega_{(h)}$ and $\Omega_{(v)}$.

Additionally, the entries in equations (35) and (36) may be normalized to satisfy a power constraint at the transmitter. For example, one way to constrain the power is to multiply the codebook entries in $\Omega_{(h)}$ and $\Omega_{(v)}$ by the normalization matrices $N_{(h)}$ and $N_{(v)}$, respectively. The normalized codebooks satisfying a specific power constraint are then given by $$\Omega_{(h)} = G_{(h)}d(\varphi_m,\theta_n)N_{(h)} \qquad (37)$$

$$\Omega_{(v)} = G_{(v)}d(\varphi_m,\theta_n)N_{(v)} \qquad (38)$$

where $N_{(h)}$ and $N_{(v)}$ are diagonal matrices of size MN×MN with the entries being defined such that a specific power constraint is satisfied.

Step 2: The characteristic matrices $G_{(h)}$ and $G_{(v)}$ and the design parameters of the 2D DFT matrix (Q, M, N) may be transmitted to the receiver side. The receiver may generate a polarimetric 2D-DFT based codebook $\Omega_{(h)}$ and $\Omega_{(v)}$, defined by the parameters (Q, M, N) and the characteristic matrices $G_{(h)}$ and $G_{(v)}$. The receiver may select the best codebook vectors from $\Omega_{(h)}$ and $\Omega_{(v)}$, and feedback the selected indices of the codebooks or the selected beamforming weights to the transmitter (e.g. eNodeB).

The characteristic matrix(ces) may be determined by the eNodeB offline, for example the computations may be performed while there is no communication with the UE, and then the characteristic matrix(ces) may be downloaded by the UE to construct the codebook of the eNodeB that is adapted to the 'non-ideal' array response. The characteristic matrices sent to the UE are a part of the 'control information' as shown in FIG. 4.

Figure 4:
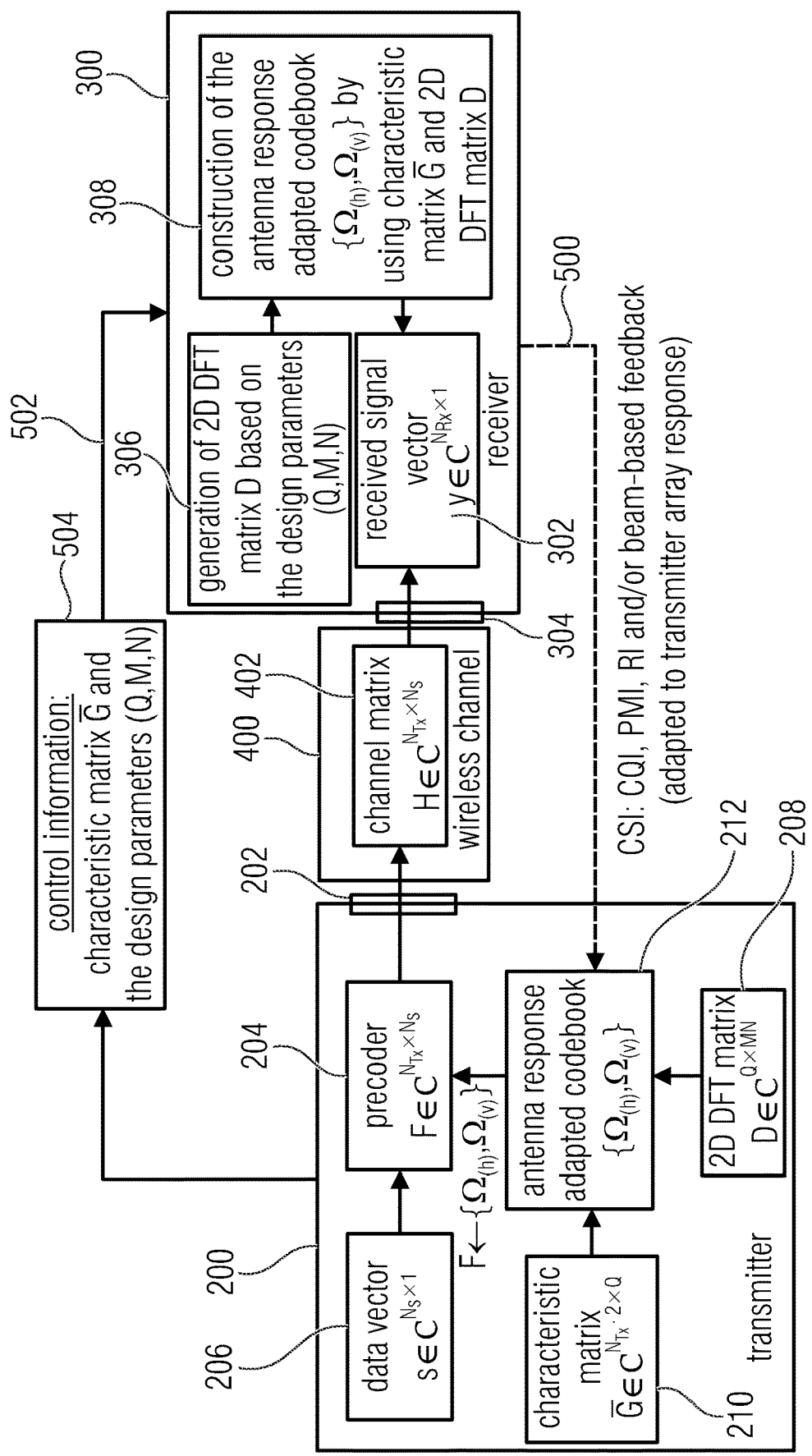
FIG. 4 shows a block diagram of a MIMO communication system similar to the system in FIG. 2 representing the transmission of control information, CSI feedback and the construction of a codebook adapted to a real antenna response in accordance with embodiments of the present invention.

FIG. 4 shows a block diagram of a MIMO system showing an embodiment of the transmission of control information, CSI feedback and the construction of a codebook adapted to the real antenna response of the transmitter's antenna array. The embodiment of FIG. 4 is described with reference to the use of a polarimetric codebook, however, the present invention is not limited to such an embodiment. The inventive approach is equally applicable to non-polarimetric codebooks. Those elements of the MIMO system corresponding to those already described above with reference to FIG. 2 have assigned thereto the same reference signs. In accordance with embodiments of the present invention, the base station 200 includes the characteristic matrices $\overline{G}$. The characteristic matrices $\overline{G}$ may be determined as described above and may be stored at the base station 200, e.g., in a storage device 210. On the basis of the characteristic matrices $\overline{G}$ and the codebook 208 for a certain antenna array (different from the antenna array 202), which may be a 2D DFT codebook for URA antenna array, the array response adapted codebook 212 is obtained and used by the precoder to obtain an expected directional beam pattern despite. In accordance with embodiments, characteristic matrices $\overline{G}$ may be transmitted to the UE 300, e.g., as control information 504 in the PDCCH 502 of the wireless communication system. The control information 504 sent to the receiver 300 may include the characteristic matrices $G_{(h)}$ and $G_{(v)}$ and the design parameters (Q, M, N) for the codebook 208. Using these parameters, the receiver generates at 306 the 2D DFT matrix D representing the codebook 208, and constructs at 308 the polarimetric codebooks $\Omega_{(h)}$ and $\Omega_{(v)}$ that are adapted to the 3D antenna response of the array 202 used at the transmitter 200.

The UE 300, on the basis of the constructed codebooks of the eNodeB or base station 200, performs an improved beam refining, channel estimation and CSI feedback taking into account the real antenna array at the transmitter 200, thereby improving the accuracy of the channel estimation process, as well as the accuracy and amount of the CSI feedback 500.

Figure 5:
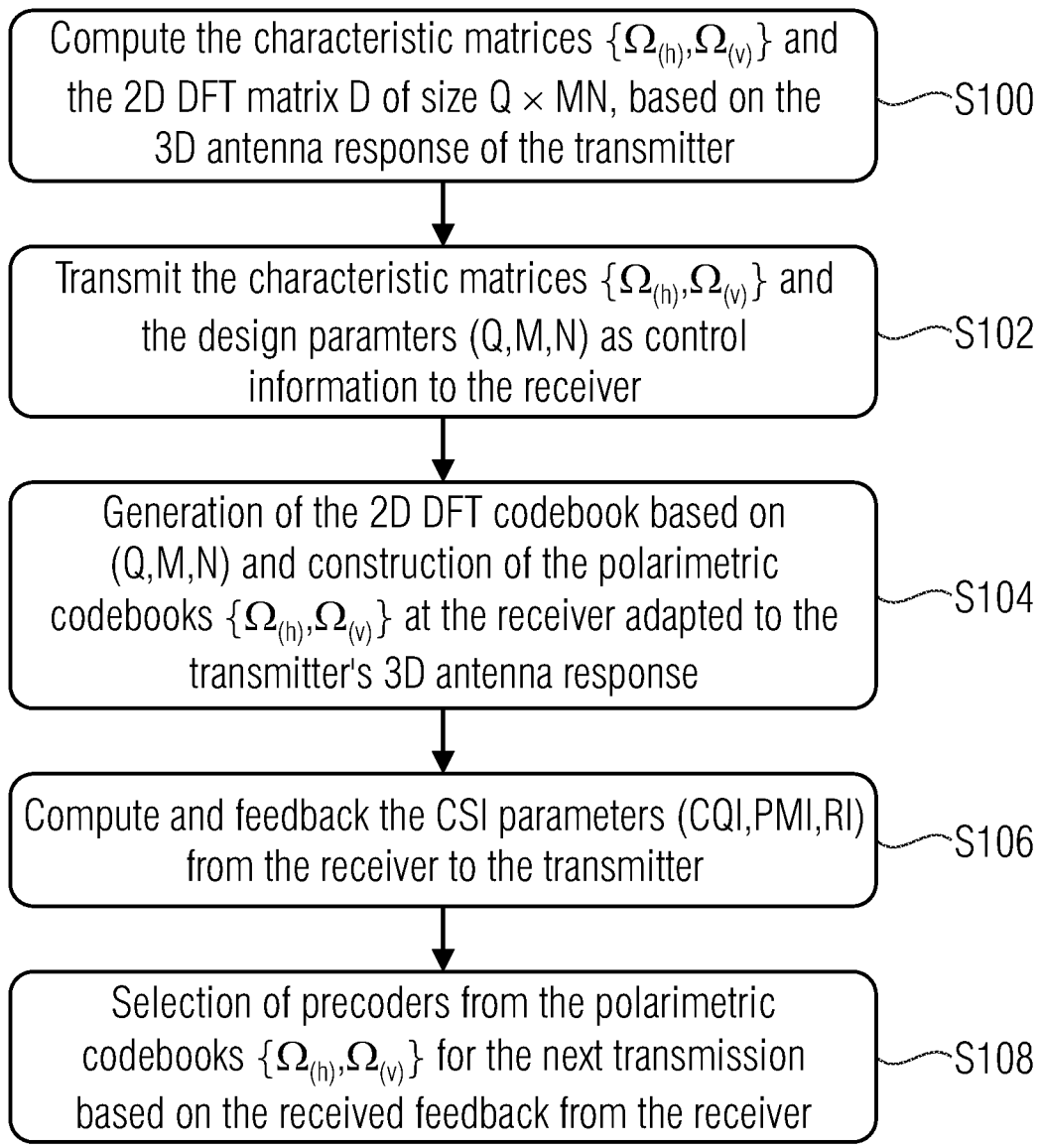
FIG. 5 shows a flowchart of a method in accordance with embodiments of the present invention of the control information transmission, generation of the codebook at the receiver and the feedback of CSI parameters.

FIG. 5 is a flowchart of a method in accordance with embodiments of the present invention of the control information transmission, generation of the codebook at the receiver and the feedback of CSI parameters. At S100, the characteristic matrices $\{G_{(h)}, G_{(v)}\}$ and the 2D DFT matrix D of size Q×MN are computed based on the 3D antenna response of the transmitter 200, and, at S102, the characteristic matrices $\{G_{(h)}, G_{(v)}\}$ and the design parameters (Q, M, N) are transmitted as the control information 504 to the receiver 300. At S104, the 2D DFT codebook is generated at the receiver 300 based on (Q, M, N) and the polarimetric codebooks $\{\Omega_{(h)}, \Omega_{(v)}\}$ are constructed at the receiver 300. At S106 the CSI parameters (CQI, PMI, RI) are computed and fed back from the receiver 300 to the transmitter 200. At S108, the precoders are selected from the polarimetric codebooks $\{\Omega_{(h)}, \Omega_{(v)}\}$ for the next transmission based on the received feedback from the receiver 300.

Further Embodiments

1. Accuracy and Null/Beam Forming Capabilities

The array manifold technique offers the flexibility in choosing the dimensions/size of the non-squared characteristic matrices $G_{(h)}$ and $G_{(v)}$, depending on the desired accuracy in the angular domain. Choosing more samples in the characteristic matrices achieves an accurate beamforming as well as null steering in a desired direction. On the other hand, a small reduction of the number of samples in the EADF matrices may not drastically reduce the beamforming capability and accuracy, but it may have a large effect on the desired null steering capability.

2. Reduction of Control Information Overhead by Compression of Matrices $G_{(h)}$ and $G_{(v)}$ Even though the sizes of the characteristic matrices are small compared to the 3D antenna response matrices $h_{(h)}(\varphi, \theta)$ and $A_{(v)}(\varphi, \theta)$, their sizes may be further reduced. One approach is to choose a reference row (e.g., an EADF of one of the available antenna ports) and take the residual of each row (all other antenna ports) with respect to the reference row chosen. By doing so, many values in the residual are close to zero. By ignoring the terms close to zero and sending only the significant entries along with the reference row chosen, the overhead in the control information may be reduced. The receiver may reconstruct the characteristic matrices.

3. Using the Characteristic Matrices as a Fixed Precoder

If only a small number of samples from the EADF of the antenna elements are used to represent the characteristic matrices, the characteristic matrices may also be used as fixed precoders. By doing so, there is no need to send these matrices to the receiver via the control channel. As a consequence, the control information overhead may be reduced. The fixed precoder at the transmitter may be defined as a function $f(\cdot)$ of the characteristic matrices $G_{(h)}$ and $G_{(v)}$. By doing so, the receiver may simply use the 2D DFT based codebook and feedbacks the CSI parameters based on the effective channel $H_{eff}$=HF, where F=$f(G_{(h)}, G_{(v)})$. Only the design parameters (Q, M, N) are used to construct the array response at the receiver.

4. Application of Characteristic Matrices as a Precoder in the Multiuser Scenario In a multi-user scenario the capability of the characteristic matrices to steer nulls and beams in the desired directions may be exploited. By appropriately choosing the precoders from the designed/constructed polarimetric codebook, nulls may be steered in the desired directions of each user and hence the multi-user interference may be mitigated.

5. Alternative Embodiments

Although the embodiments above have been described for a downlink data transmission in which the base station operates as a transmitter and the UE operates as a receiver, the inventive approach is not limited to such embodiments. In accordance with other embodiments, the inventive approach is equally applicable in an uplink (UL) transmission of the mobile multiple input multiple output communication system, e.g., the communication link carrying data traffic from the mobile user equipment (UE) to the base station (eNodeB). In such embodiments the UE operates as the transmitter and the base station operates as the receiver.

Although the embodiments above describe that the one or more characteristic matrices are transmitted from the base station of transmitter to the UE or receiver, the present invention is not limited to such embodiments. In accordance with other embodiments, the one or more characteristic matrices may be directly calculated at the receiver on the basis of a model of the transmitter's antenna array.

Figure 2:
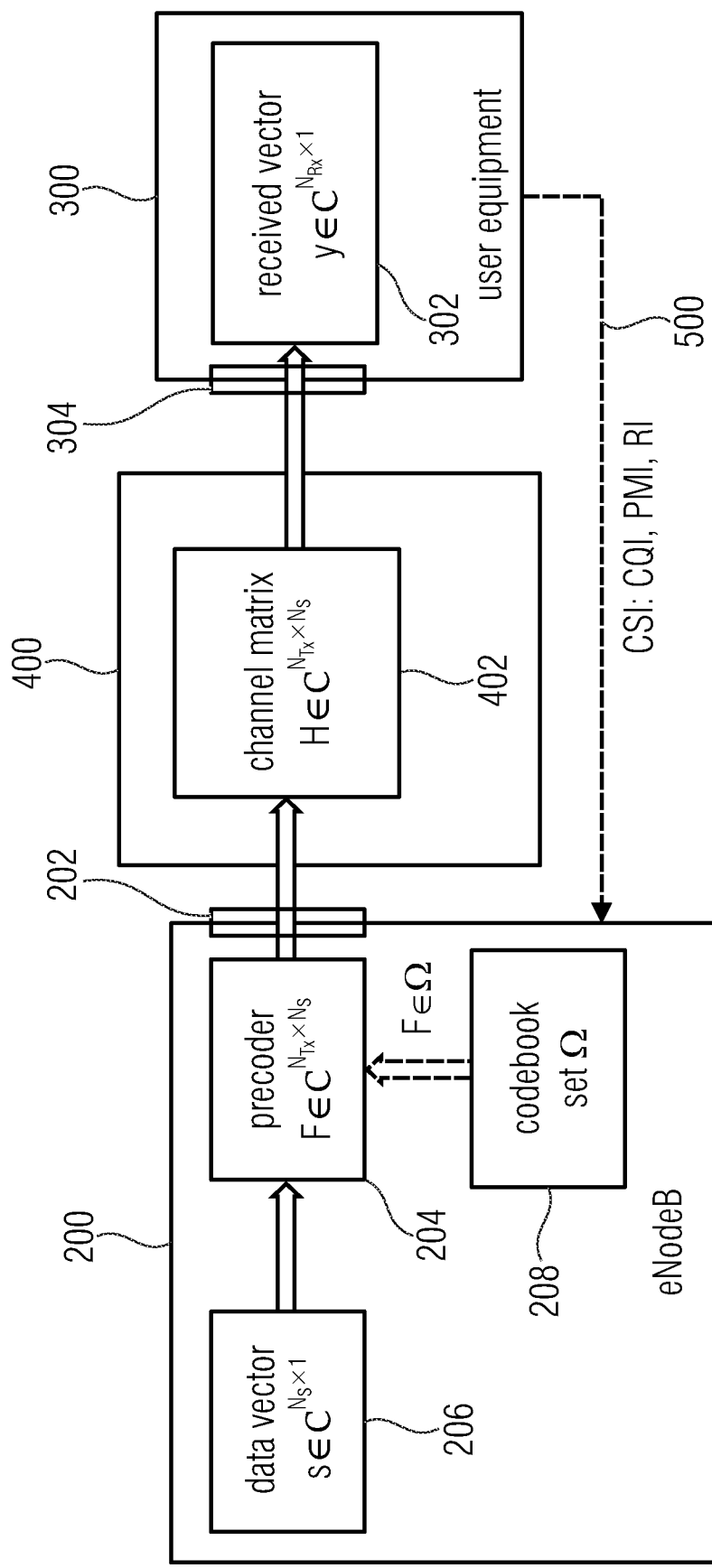
FIG. 2 shows a block-based model of a MIMO communication system using implicit CSI feedback.
Figure 3:
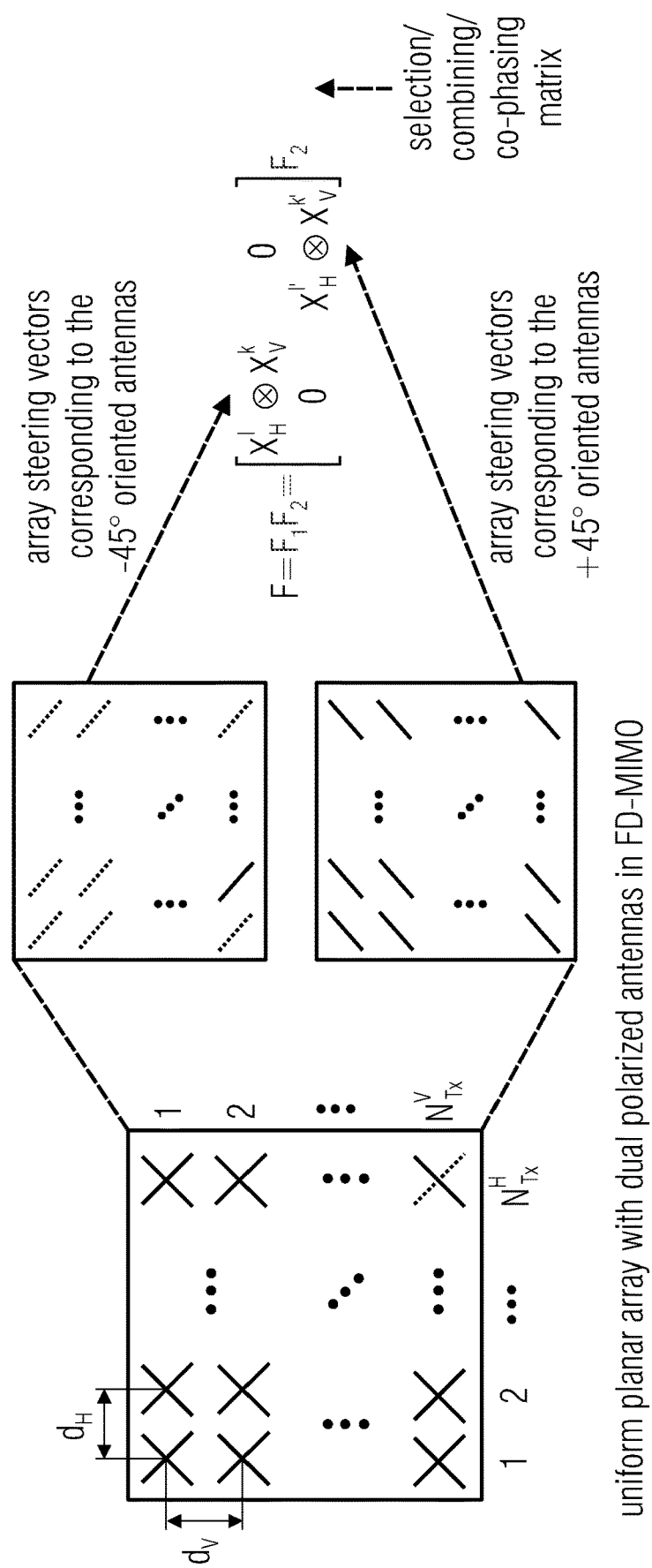
FIG. 3 shows an example of a ($N_{Tx}^H$, $N_{Tx}^V$, 2) uniform planar array in FD-MIMO and the corresponding precoding matrix structure.
Figure 6:
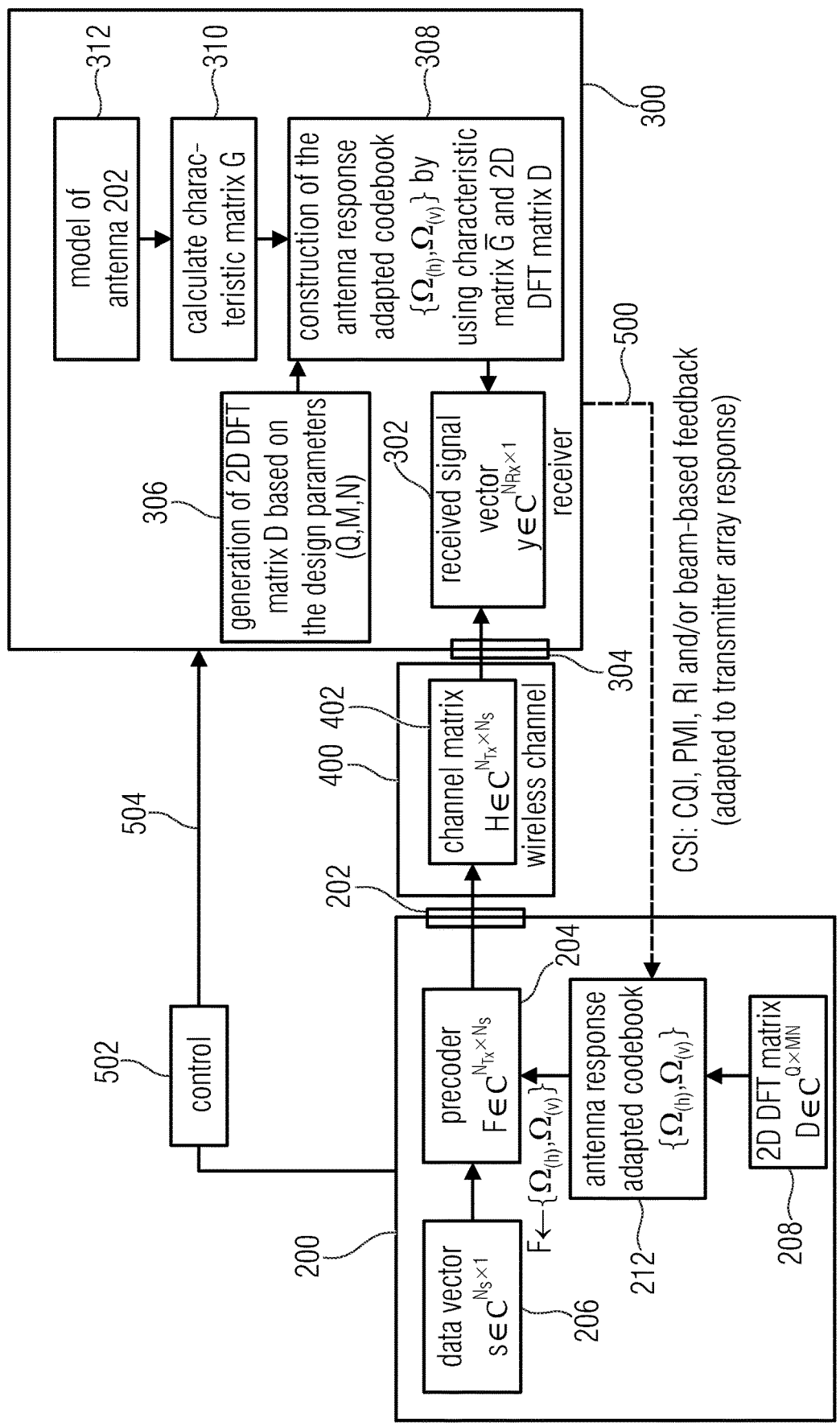
FIG. 6 shows a block diagram of a MIMO communication system similar to the system in FIG. 2 and FIG. 4 representing the transmission of control information, CSI feedback and the construction of a codebook adapted to a real antenna response using a characteristic matrix calculated at the receiver in accordance with embodiments of the present invention.

FIG. 6 shows a block diagram of a MIMO communication system similar to the system in FIG. 2 and FIG. 4 representing the CSI feedback and the construction of a codebook adapted to a real antenna response using a characteristic matrix calculated at the receiver in accordance with embodiments of the present invention. The embodiment of FIG. 6 is described with reference to the use of a polarimetric codebook, however, the present invention is not limited to such an embodiment. The inventive approach is equally applicable to non-polarimetric codebooks. Those elements of the MIMO system corresponding to those already described above with reference to FIG. 2 or to FIG. 4 have assigned thereto the same reference signs. In accordance with this embodiment of the present invention, the characteristic matrix $\overline{G}$ is calculated at the receiver 300 as is indicated at 310, and the base station 200 does not include the characteristic matrices $\overline{G}$. The characteristic matrices $\overline{G}$ may be determined as described above using a model of the transmitter's antenna 202 that may be stored at the receiver 300, e.g., in a storage device 312. In accordance with embodiments, control information 502 may be transmitted to the UE 300, e.g., in the PDCCH 504 of the wireless communication system. The control information 504 sent to the receiver 300 may include the design parameters (Q, M, N) for the codebook 208. Using these parameters, the receiver 300 generates or calculates at 306 the 2D DFT matrix D representing the codebook 208, and constructs at 308 the polarimetric codebooks $\Omega_{(h)}$ and $\Omega_{(v)}$ that are adapted to the 3D antenna response of the array 202 used at the transmitter 200 using the characteristic matrices $\overline{G}$ calculated at 310 and the 2D DFT matrix D calculated at 306.

The receiver 300 may calculate one or more of the characteristic matrices G, $G_{(h)}$, $G_{(v)}$ based on the model 312 of the transmitter antenna array 202 and based on (a) received position data of antenna elements of the transmitter antenna array and a preferred polarization of each antenna element, and/or (b) structural and/or geometrical data of the transmitter antenna array. This additional data may be received at the receiver 300 from the bases station or transmitter 200, e.g., as part of the control information 504.

The preferred polarization of each antenna element may comprise a first polarization or a second polarization, the first and second polarizations being orthogonal to each other. For example, the first polarization may be a horizontal polarization (polarization of 0°), and the second polarization may be a vertical polarization (polarization of 90°). In accordance with other examples, the first polarization may be a polarization of +45°, and the second polarization may be a polarization of −45°. Naturally, any other orthogonal polarization angles may be selected for the first and second polarizations.

The structural and/or geometrical data of the transmitter antenna array may comprise one or more of a number of antenna elements, and the preferred polarization of the antenna elements, and a distance at which the antenna elements are arranged. In case the transmitter antenna array comprises a cylindrical array, the structural and/or geometrical data comprise a radius of the transmitter antenna array.

The UE 300, on the basis of the constructed codebooks of the eNodeB or base station 200, performs an improved beam refining, channel estimation and CSI feedback taking into account the real antenna array at the transmitter 200, thereby improving the accuracy of the channel estimation process, as well as the accuracy and amount of the CSI feedback 500.

Although the embodiments above have been described with reference to a 1-dimensional antenna array, like a Uniform Linear Array, or a 2-dimensional antenna array, like a Uniform Planar Array, the inventive approach is not limited to such embodiments. In accordance with other embodiments, the inventive approach is equally applicable to any antenna array, like a 1-dimensional antenna array, or a 2-dimensional antenna array or a 3-dimensional antenna array of any array configuration.

Some of the embodiments above refer to a horizontal polarization and a vertical polarization, and the horizontal polarization may be referred to as a polarization of 0°, and the vertical polarization may be referred to as a polarization of 90°. However, the present invention is not limited to such horizontal and vertical polarizations, rather, in accordance with other embodiments, any other orthogonal polarization angles may be selected for the first and second polarizations. For example, a first polarization of +45°, and a second polarization of −45° may be used.

Further embodiments of the present invention are now described.

A $1^{st}$ embodiment provides a transmitter, comprising an antenna array having a plurality of antennas for a wireless communication with one or more receivers, and a precoder connected to the antenna array, the precoder to apply a set of beamforming weights to the antenna array, the set of beamforming weights selected from a codebook to form by the antenna array one or more transmit/receive beams or nulls pointing in selected directions, wherein the codebook includes a plurality of sets of beamforming weights for a plurality of directions, wherein the beamforming weights in the codebook are based on a first antenna array response matrix, the first antenna array response matrix defined by a second antenna array response matrix and one or more characteristic matrices, and wherein the first antenna response matrix contains, for a plurality of directions, first array response vectors of the antenna array, the second antenna array response matrix contains, for one or more of the plurality of directions, second array response vectors of another antenna array, the other antenna array being different from the antenna array, and the one or more characteristic matrices describing one or more characteristics of the antenna array.

A $2^{nd}$ embodiment provides the transmitter of the $1^{st}$ embodiment, wherein the one or more characteristic matrices are based on a model of the antenna array or on a measured antenna array response matrix containing, for some or all of the plurality of directions, measured array response vectors determined from a measurement of the antenna array.

A $3^{rd}$ embodiment provides the transmitter of the $2^{nd}$ embodiment, wherein the model of the antenna array or the measurement of the antenna array considers a directional and non-identical nature of one or more of the respective antennas in the antenna array, and/or an electromagnetic coupling between the respective antennas in the antenna array, and/or other practical imperfections in the antenna array.

A $4^{th}$ embodiment provides the transmitter of the $1^{st}$ or $2^{nd}$ embodiments, wherein the model of the antenna array or the measurement of the antenna array describes one or more radiation characteristics of one or more of the antennas of the antenna array, the radiation characteristics including one or more of a phase and an amplitude due to a position of an antenna in the antenna array, and/or a coupling imbalance, and/or a manufacturing imbalance.

A $5^{th}$ embodiment provides the transmitter of one of the $1^{st}$ to $4^{th}$ embodiments, wherein the other antenna array comprises a 1-dimensional antenna array, or a 2-dimensional antenna array or a 3-dimensional antenna array.

A $6^{th}$ embodiment provides the transmitter of one of the $1^{st}$ to $5^{th}$ embodiments, wherein the second antenna array response matrix is defined by a 2D-DFT based matrix.

A $7^{th}$ embodiment provides the transmitter of one of the $1^{st}$ to $6^{th}$ embodiments, wherein the first antenna array response matrix is modeled using the second antenna array response matrix and the one or more characteristic matrices.

An $8^{th}$ embodiment provides the transmitter of one of the $1^{st}$ to $7^{th}$ embodiments, wherein the codebook is obtained from a first codebook modified using the one or more characteristic matrices, the first codebook defined by the second array response vectors of the second antenna array response matrix.

A $9^{th}$ embodiment provides the transmitter of one of the $1^{st}$ to $8^{th}$ embodiments, wherein the first antenna array response matrix comprises a first antenna array response submatrix and a second antenna array response submatrix, wherein the first antenna array response submatrix contains, for the plurality of directions, the array response vectors of all antenna ports in the antenna array with respect to the horizontal polarization of an wavefront, and wherein the second antenna array response submatrix contains, for the same directions as in the first submatrix, the array response vectors of all antenna ports in the antenna array with respect to the vertical polarization of the wavefront.

A $10^{th}$ embodiment provides the transmitter of the $9^{th}$ embodiment, comprising a first characteristic matrix corresponding to the horizontal polarization, the first antenna array response submatrix modeled by the second array response vectors of the second antenna array response matrix and the first characteristic matrix, and a second characteristic matrix corresponding to the vertical polarization, the second antenna array response submatrix modeled by the second array response vectors of the second antenna array response matrix and the second characteristic matrix.

An $11^{th}$ embodiment provides the transmitter of the $10^{th}$ embodiment, wherein the codebook comprises a polarimetric codebook, the polarimetric codebook containing a first sub-codebook and a second sub-codebook, wherein the first sub-codebook contains beamforming weights for all antenna ports with respect to the horizontal polarization, the beamforming weights based on the first antenna array response submatrix, and wherein the second sub-codebook contains beamforming weights for all antenna ports with respect to the vertical polarization, the beamforming weights based on the second antenna array response submatrix.

A $12^{th}$ embodiment provides the transmitter of one of the $1^{st}$ to $11^{th}$ embodiments, wherein the transmitter is configured to transmit the one or more characteristic matrices to the one or more receivers.

A $13^{th}$ embodiment provides the transmitter of the $12^{th}$ embodiment, wherein the transmitter is configured to transmit the one or more characteristic matrices as part of control information to the receiver.

A $14^{th}$ embodiment provides the transmitter of the $12^{th}$ or $13^{th}$ embodiment, wherein the transmitter is configured to transmit one or more design parameters of the codebook of the other antenna array to the receiver side.

A $15^{th}$ embodiment provides the transmitter of one of the $1^{st}$ to $14^{th}$ embodiments, wherein the antenna array comprises a 1-dimensional antenna array, or a 2-dimensional antenna array or a 3-dimensional antenna array.

A $16^{th}$ embodiment provides the transmitter of the $15^{th}$ embodiments, wherein the 2-dimensional antenna array or the 3-dimensional antenna array controls the radio wave for beamforming both in the vertical direction and the horizontal direction, the precoder having a dual-stage structure, the first stage containing the sets of beamforming weights based on the codebook to be applied to each antenna element of the antenna array, the second stage containing coefficients that select and/or linearly combine the beams defined by the first stage to obtain a desired beam pattern.

A $17^{th}$ embodiment provides a receiver, comprising an antenna for a wireless communication with a transmitter, and a signal processor to receive and process a radio signal received at the antenna via a radio channel, wherein the receiver is configured to construct a codebook including a plurality of sets of beamforming weights for a plurality of directions, the beamforming weights in the codebook being based on a first antenna array response matrix of an antenna array of the transmitter, and the transmitter selecting a set of beamforming weights from the codebook to form by the antenna array a transmit/receive beam pointing in a selected direction, wherein the receiver is configured to construct the codebook using a second antenna array response matrix and one or more characteristic matrices received from the transmitter, and wherein the first antenna array response matrix contains, for a plurality of directions, first array response vectors of the antenna array, the second antenna array response matrix contains, for one or more of the plurality of directions, second array response vectors of another antenna array, the other antenna array being different from the transmitter's antenna array, and the one or more characteristic matrices describing one or more characteristics of the transmitter's antenna array.

An $18^{th}$ embodiment provides the receiver of the $17^{th}$ embodiment, wherein the receiver is configured for a wireless communication with a transmitter of one of the $1^{st}$ to $16^{th}$ embodiments.

A $19^{th}$ embodiment provides the receiver of the $17^{th}$ or $18^{th}$ embodiments, comprising a channel estimator to estimate a state of the radio channel, wherein the receiver is configured to determine, based on the radio channel estimation and the constructed codebook, a feedback to the transmitter, the transmitter selecting, on the basis of the feedback, a set of beamforming weights from the codebook to form the transmit/receive beam, and wherein the feedback includes control signals on the basis of which the transmitter selects a set of beamforming weights, or the feedback transmits a set of beamforming weights from the receiver to the transmitter.

A $20^{th}$ embodiment provides a wireless communication network, comprising a transmitter of one of the $1^{st}$ to $16^{th}$ embodiments, and one or more receivers of one of the $17^{th}$ to $19^{th}$ embodiments.

A $21^{st}$ embodiment provides the wireless communication network of the $20^{th}$ embodiment, comprising a cellular network, a wireless local area network or a wireless sensor system.

A $22^{nd}$ embodiment provides the wireless communication network of the $20^{th}$ or $21^{st}$ embodiments, wherein the transmitter comprises a base station serving a user equipment, or a user equipment served by a base station, or wherein the receiver comprises a base station serving a user equipment, or a user equipment served by a base station.

A $23^{rd}$ embodiment provides the wireless communication network of the $22^{nd}$ embodiment, wherein the user equipment comprises a mobile terminal, or an IoT device, or a device implemented inside a moving vehicle, like a moving vehicle, e.g., a car or a robot, or inside a flying device, e.g., an unmanned aerial vehicle (UAV) or a plane.

A $24^{th}$ embodiment provides the wireless communication network of one of the $20^{th}$ to $23^{rd}$ embodiments, using an IFFT (Inverse Fast Fourier Transform) based signal, wherein the IFFT based signal includes OFDM with CP, DFT-s-OFDM with CP, IFFT-based waveforms without CP, f-OFDM, FBMC, GFDM or UFMC.

A $25^{th}$ embodiment provides a method, comprising determining a codebook used by a precoder of a transmitter, the transmitter including an antenna array having a plurality of antennas for a wireless communication with one or more receivers, and the precoder connected to the antenna array, the codebook including a plurality of sets of beamforming weights for a plurality of directions, the beamforming weights in the codebook based on a first antenna array response matrix, wherein determining a codebook includes obtaining the first antenna array response matrix using a second antenna array response matrix and one or more characteristic matrices, and wherein the first antenna array response matrix contains, for a plurality of directions, first array response vectors of the antenna array, the second antenna array response matrix contains, for one or more of the plurality of directions, second array response vectors of another antenna array, the other antenna array being different from the antenna array, and the one or more characteristic matrices describing one or more characteristics of the antenna array.

A $26^{th}$ embodiment provides the method of the $25^{th}$ embodiment, comprising transmitting the one or more characteristic matrices to the one or more receivers to allow the receiver to construct a codebook at the receiver.

A 27$^{th}$ embodiment provides a method, comprising receiving and processing, at a receiver having an antenna for a wireless communication with a transmitter, a radio signal received at the antenna via a radio channel, the radio signal including one or more characteristic matrices, and constructing a codebook at the receiver, the codebook including a plurality of sets of beamforming weights for a plurality of directions, the beamforming weights in the codebook being based on a first antenna array response matrix of an antenna array of the transmitter, and the transmitter selecting a set of beamforming weights from the codebook to form by an antenna array a transmit/receive beam pointing in a selected direction, wherein the codebook is constructed using a second antenna array response matrix and the one or more characteristic matrices received from the transmitter, and wherein the first antenna array response matrix contains, for a plurality of directions, first array response vectors of the antenna array, the second antenna array response matrix contains, for one or more of the plurality of directions, second array response vectors of another antenna array, the other antenna array being different from the transmitter's antenna array, and the one or more characteristic matrices describing one or more characteristics of the transmitter's antenna array.

A 28$^{th}$ embodiment provides a non-transitory computer program product comprising a computer readable medium storing instructions which, when executed on a computer, perform the method of one of the 25$^{th}$ to 27$^{th}$ embodiments.

Although some aspects of the described concept have been described in the context of an apparatus, it is clear that these aspects also represent a description of the corresponding method, where a block or a device corresponds to a method step or a feature of a method step. Analogously, aspects described in the context of a method step also represent a description of a corresponding block or item or feature of a corresponding apparatus.

Various elements and features of the present invention may be implemented in hardware using analog and/or digital circuits, in software, through the execution of instructions by one or more general purpose or special-purpose processors, or as a combination of hardware and software. For example, embodiments of the present invention may be implemented in the environment of a computer system or another processing system. FIG. 7 illustrates an example of a computer system 600. The units or modules as well as the steps of the methods performed by these units may execute on one or more computer systems 600. The computer system 600 includes one or more processors 602, like a special purpose or a general purpose digital signal processor. The processor 602 is connected to a communication infrastructure 604, like a bus or a network. The computer system 600 includes a main memory 606, e.g., a random access memory (RAM), and a secondary memory 608, e.g., a hard disk drive and/or a removable storage drive. The secondary memory 608 may allow computer programs or other instructions to be loaded into the computer system 600. The computer system 600 may further include a communications interface 610 to allow software and data to be transferred between computer system 600 and external devices. The communication may be in the form electronic, electromagnetic, optical, or other signals capable of being handled by a communications interface. The communication may use a wire or a cable, fiber optics, a phone line, a cellular phone link, an RF link and other communications channels 612.

The terms "computer program medium" and "computer readable medium" are used to generally refer to tangible storage media such as removable storage units or a hard disk installed in a hard disk drive. These computer program products are means for providing software to the computer system 600. The computer programs, also referred to as computer control logic, are stored in main memory 606 and/or secondary memory 608. Computer programs may also be received via the communications interface 610. The computer program, when executed, enables the computer system 600 to implement the present invention. In particular, the computer program, when executed, enable processor 602 to implement the processes of the present invention, such as any of the methods described herein. Accordingly, such a computer program may represent a controller of the computer system 600. Where the disclosure is implemented using software, the software may be stored in a computer program product and loaded into computer system 600 using a removable storage drive, an interface, like communications interface 610.

The implementation in hardware or in software may be performed using a digital storage medium, for example cloud storage, a floppy disk, a DVD, a Blue-Ray, a CD, a ROM, a PROM, an EPROM, an EEPROM or a FLASH memory, having electronically readable control signals stored thereon, which cooperate (or are capable of cooperating) with a programmable computer system such that the respective method is performed. Therefore, the digital storage medium may be computer readable.

Some embodiments according to the invention comprise a data carrier having electronically readable control signals, which are capable of cooperating with a programmable computer system, such that one of the methods described herein is performed.

Generally, embodiments of the present invention may be implemented as a computer program product with a program code, the program code being operative for performing one of the methods when the computer program product runs on a computer. The program code may for example be stored on a machine readable carrier.

Other embodiments comprise the computer program for performing one of the methods described herein, stored on a machine readable carrier. In other words, an embodiment of the inventive method is, therefore, a computer program having a program code for performing one of the methods described herein, when the computer program runs on a computer.

A further embodiment of the inventive methods is, therefore, a data carrier (or a digital storage medium, or a computer-readable medium) comprising, recorded thereon, the computer program for performing one of the methods described herein. A further embodiment of the inventive method is, therefore, a data stream or a sequence of signals representing the computer program for performing one of the methods described herein. The data stream or the sequence of signals may for example be configured to be transferred via a data communication connection, for example via the Internet. A further embodiment comprises a processing means, for example a computer, or a programmable logic device, configured to or adapted to perform one of the methods described herein. A further embodiment comprises a computer having installed thereon the computer program for performing one of the methods described herein.

In some embodiments, a programmable logic device (for example a field programmable gate array) may be used to perform some or all of the functionalities of the methods described herein. In some embodiments, a field programmable gate array may cooperate with a microprocessor in order to perform one of the methods described herein. Generally, the methods may be performed by any hardware apparatus.

Yet further embodiments are now described.

A $1^{st}$ embodiment provides a transmitter, comprising an antenna array (202, 304) having a plurality of antennas for a wireless communication with one or more receivers; and a precoder (204) connected to the antenna array (202, 304), the precoder (204) to apply a set of beamforming weights to the antenna array (202, 304), the set of beamforming weights selected from a codebook (212) to form by the antenna array (202, 304) one or more transmit/receive beams or nulls pointing in selected directions; wherein the codebook (212) includes a plurality of sets of beamforming weights for a plurality of directions, wherein the beamforming weights in the codebook (212) are based on a first antenna array response matrix (A($\varphi$, $\theta$), $A_{(h)}(\varphi, \theta)$, $A_{(v)}(\varphi, \theta)$), the first antenna array response matrix (A($\varphi$, $\theta$), $A_{(h)}(\varphi, \theta)$, $A_{(v)}(\varphi, \theta)$) defined by a second antenna array response matrix (D($\varphi$, $\theta$)) and one or more characteristic matrices (G, $G_{(h)}$, $G_{(v)}$), and wherein the first antenna array response matrix (A($\varphi$, $\theta$), $A_{(h)}(\varphi, \theta)$, $A_{(v)}(\varphi, \theta)$) contains, for a plurality of directions, first array response vectors of the antenna array (202, 304), the second antenna array response matrix (D($\varphi$, $\theta$)) contains, for one or more of the plurality of directions, second array response vectors of another antenna array, the other antenna array being different from the antenna array (202, 304), and the one or more characteristic matrices (G, $G_{(h)}$, $G_{(v)}$) describing one or more characteristics of the antenna array (202, 304).

A $2^{nd}$ embodiment provides the transmitter of the $1^{st}$ embodiment, wherein the one or more characteristic matrices (G, $G_{(h)}$, $G_{(v)}$) are based on a model of the antenna array (202, 304) or on a measured antenna array response matrix containing, for some or all of the plurality of directions, measured array response vectors determined from a measurement of the antenna array (202, 304).

A $3^{rd}$ embodiment provides the transmitter of the $2^{nd}$ embodiment, wherein the model of the antenna array (202, 304) or the measurement of the antenna array (202, 304) considers a directional and non-identical nature of one or more of the respective antennas in the antenna array (202, 304), and/or an electromagnetic coupling between the respective antennas in the antenna array (202, 304), and/or other practical imperfections in the antenna array (202, 304).

A $4^{th}$ embodiment provides the transmitter of the $2^{nd}$ embodiment or of the $3^{rd}$ embodiment, wherein the model of the antenna array (202, 304) or the measurement of the antenna array (202, 304) describes one or more radiation characteristics of one or more of the antennas of the antenna array (202, 304), the radiation characteristics including one or more of a phase and an amplitude due to a position of an antenna in the antenna array (202, 304), and/or a coupling imbalance, and/or a manufacturing imbalance.

A $5^{th}$ embodiment provides the transmitter of any one of the $1^{st}$ to $4^{th}$ embodiments, wherein the other antenna array comprises a 1-dimensional antenna array, or a 2-dimensional antenna array or a 3-dimensional antenna array.

A $6^{th}$ embodiment provides the transmitter of any one of the $1^{st}$ to $5^{th}$ embodiments, wherein the second antenna array response matrix (D($\varphi$, $\theta$)) is defined by a 2D-DFT based matrix.

A $7^{th}$ embodiment provides the transmitter of any one of the $1^{st}$ to $6^{th}$ embodiments, wherein the first antenna array response matrix (A($\varphi$, $\theta$), $A_{(h)}(\varphi, \theta)$, $A_{(v)}(\varphi, \theta)$) is modeled using the second antenna array response matrix (D($\varphi$, $\theta$)) and the one or more characteristic matrices (G, $G_{(h)}$, $G_{(v)}$).

An $8^{th}$ embodiment provides the transmitter of any one of the $1^{st}$ to $7^{th}$ embodiments, wherein the codebook (212) is obtained from a first codebook (208) modified using the one or more characteristic matrices (G, $G_{(h)}$, $G_{(v)}$), the first codebook (208) defined by the second array response vectors of the second antenna array response matrix (D($\varphi$, $\theta$)).

A $9^{th}$ embodiment provides the transmitter of any one of the $1^{st}$ to $8^{th}$ embodiments, wherein the first antenna response comprises a first antenna array response matrix A($\varphi$, $\theta$), the first antenna array matrix A($\varphi$, $\theta$) contains, for the plurality of directions, the array response vectors of all antenna ports in the antenna array.

A $10^{th}$ embodiment provides the transmitter of the $9^{th}$ embodiment, comprising a first characteristic matrix (G), the first antenna array response matrix (A($\varphi$, $\theta$)) modeled by the second array response vectors of the second antenna array response matrix (D($\varphi$, $\theta$)) and the characteristic matrix (G).

An $11^{th}$ embodiment provides the transmitter of the $10^{th}$ embodiment, wherein the codebook (212) $\Omega$ contains beamforming weights for all antenna ports, the beamforming weights based on the first antenna array response matrix (A($\varphi$, $\theta$)).

A $12^{th}$ embodiment provides the transmitter of any one of the $1^{st}$ to $11^{th}$ embodiments, wherein the first antenna array response matrix comprises a first antenna array response submatrix ($A_{(h)}(\varphi, \theta)$) and a second antenna array response submatrix ($A_{(v)}(\varphi, \theta)$), the first antenna array response submatrix ($A_{(h)}(\varphi, \theta)$) contains, for the plurality of directions, the array response vectors of all antenna ports in the antenna array (202, 304) with respect to the horizontal polarization of an wavefront, and the second antenna array response submatrix ($A_{(v)}(\varphi, \theta)$) contains, for the same directions as in the first submatrix ($A_{(h)}(\varphi, \theta)$), the array response vectors of all antenna ports in the antenna array (202, 304) with respect to the vertical polarization of the wavefront.

A $13^{th}$ embodiment provides the transmitter of the $12^{th}$ embodiment, comprising a first characteristic matrix ($G_{(h)}$) corresponding to the horizontal polarization, the first antenna array response submatrix ($A_{(h)}(\varphi, \theta)$) modeled by the second array response vectors of the second antenna array response matrix (D($\varphi$, $\theta$)) and the first characteristic matrix ($G_{(h)}$), and a second characteristic matrix ($G_{(v)}$) corresponding to the vertical polarization, the second antenna array response submatrix ($A_{(v)}(\varphi, \theta)$) modeled by the second array response vectors of the second antenna array response matrix (D($\varphi$, $\theta$)) and the second characteristic matrix ($G_{(v)}$).

An $14^{th}$ embodiment provides the transmitter of the $13^{th}$ embodiment, wherein the codebook (212) comprises a polarimetric codebook, the polarimetric codebook containing a first sub-codebook ($\Omega_{(h)}$) and a second sub-codebook ($\Omega_{(v)}$), the first sub-codebook ($\Omega_{(h)}$) contains beamforming weights for all antenna ports with respect to the horizontal polarization, the beamforming weights based on the first antenna array response submatrix ($A_{(h)}(\varphi, \theta)$), and the second sub-codebook ($\Omega_{(v)}$) contains beamforming weights for all antenna ports with respect to the vertical polarization, the beamforming weights based on the second antenna array response submatrix ($A_{(v)}(\varphi, \theta)$).

A $15^{th}$ embodiment provides the transmitter of any one of the $1^{st}$ to $14^{th}$ embodiments, wherein the transmitter is configured to transmit the one or more characteristic matrices (G, $G_{(h)}$, $G_{(v)}$) to the one or more receivers as part of control information (504) for the receiver.

A $16^{th}$ embodiment provides the transmitter of the $15^{th}$ embodiment, wherein the transmitter is configured to transmit one or more design parameters of the codebook (208) of the other antenna array to the receiver side.

A 17$^{th}$ embodiment provides the transmitter of any one of the 1$^{st}$ to 16$^{th}$ embodiments, wherein the antenna array (202, 304) comprises a 1-dimensional antenna array, or a 2-dimensional antenna array or a 3-dimensional antenna array, and wherein the 2-dimensional antenna array or the 3-dimensional antenna array controls the radio wave for beamforming both in the vertical direction and the horizontal direction, the precoder (204) having a dual-stage structure, the first stage containing the sets of beamforming weights based on the codebook (212) to be applied to each antenna of the antenna array (202, 304), the second stage containing coefficients that select and/or linearly combine the beams defined by the first stage to obtain a desired beam pattern.

A 18$^{th}$ embodiment provides a receiver, comprising an antenna (202, 304) for a wireless communication with a transmitter; and a signal processor (302, 306, 306) to receive and process a radio signal received at the antenna via a radio channel (400); wherein the receiver is configured to construct a codebook (212) including a plurality of sets of beamforming weights for a plurality of directions, the beamforming weights in the codebook (212) being based on a first antenna array response matrix ($A(\varphi, \theta)$, $A_{(h)}(\varphi, \theta)$, $A_{(v)}(\varphi, \theta)$) of an antenna array (202, 304) of the transmitter, and the transmitter selecting a set of beamforming weights from the codebook (212) to form by the antenna array (202, 304) a transmit/receive beam pointing in a selected direction, wherein the receiver is configured to construct the codebook (212) using a second antenna array response matrix ($D(\varphi, \theta)$) and one or more characteristic matrices ($G$, $G_{(h)}$, $G_{(v)}$) received from the transmitter, and wherein the first antenna array response matrix ($A(\varphi, \theta)$, $A_{(h)}(\varphi, \theta)$, $A_{(v)}(\varphi, \theta)$) contains, for a plurality of directions, first array response vectors of the antenna array (202, 304), the second antenna array response matrix ($D(\varphi, \theta)$) contains, for one or more of the plurality of directions, second array response vectors of another antenna array, the other antenna array being different from the transmitter's antenna array (202, 304), and the one or more characteristic matrices ($G$, $G_{(h)}$, $G_{(v)}$) describing one or more characteristics of the transmitter's antenna array (202, 304).

A 19$^{th}$ embodiment provides the receiver of the 18$^{th}$ embodiment, wherein the receiver is configured for a wireless communication with a transmitter of any one of the 1$^{st}$ to 17$^{th}$ embodiments.

A 20$^{th}$ embodiment provides the receiver of the 18$^{th}$ embodiment or of the 19$^{th}$ embodiment, comprising a channel estimator to estimate a state of the radio channel, wherein the receiver is configured to determine, based on the radio channel estimation and the constructed codebook (212), a feedback (500) to the transmitter, the transmitter selecting, on the basis of the feedback, a set of beamforming weights from the codebook (212) to form the transmit/receive beam, and wherein the feedback includes control signals on the basis of which the transmitter selects a set of beamforming weights, or the feedback transmits a set of beamforming weights from the receiver to the transmitter.

An 21$^{st}$ embodiment provides a wireless communication network, comprising a transmitter of any one of the 1$^{st}$ to 14$^{th}$ embodiments; and one or more receivers of any one of the 18$^{th}$ to 20$^{th}$ embodiments.

A 22$^{nd}$ embodiment provides the wireless communication network of the 21$^{st}$ embodiment, wherein the transmitter comprises a base station serving a user equipment, or a user equipment served by a base station, or the receiver comprises a base station serving a user equipment, or a user equipment served by a base station.

A 23$^{rd}$ embodiment provides a method, comprising determining a codebook (212) used by a precoder (204) of a transmitter, the transmitter including an antenna array (202, 304) having a plurality of antennas for a wireless communication with one or more receivers, and the precoder (204) connected to the antenna array (202, 304), the codebook (212) including a plurality of sets of beamforming weights for a plurality of directions, the beamforming weights in the codebook (212) based on a first antenna array response matrix ($A(\varphi, \theta)$, $A_{(h)}(\varphi, \theta)$, $A_{(v)}(\varphi, \theta)$), wherein determining a codebook (212) includes obtaining the first antenna array response matrix ($A(\varphi, \theta)$, $A_{(h)}(\varphi, \theta)$, $A_{(v)}(\varphi, \theta)$) using a second antenna array response matrix ($D(\varphi, \theta)$) and one or more characteristic matrices ($G$, $G_{(h)}$, $G_{(v)}$), and wherein the first antenna array response matrix ($A(\varphi, \theta)$, $A_{(h)}(\varphi, \theta)$, $A_{(v)}(\varphi, \theta)$) contains, for a plurality of directions, first array response vectors of the antenna array (202, 304), the second antenna array response matrix ($D(\varphi, \theta)$) contains, for one or more of the plurality of directions, second array response vectors of another antenna array, the other antenna array being different from the antenna array (202, 304), and the one or more characteristic matrices ($G$, $G_{(h)}$, $G_{(v)}$) describing one or more characteristics of the antenna array (202, 304).

A 24$^{st}$ embodiment provides a method, comprising receiving and processing, at a receiver having an antenna for a wireless communication with a transmitter, a radio signal received at the antenna via a radio channel, the radio signal including one or more characteristic matrices ($G$, $G_{(h)}$, $G_{(v)}$); and constructing a codebook (212) at the receiver, the codebook (212) including a plurality of sets of beamforming weights for a plurality of directions, the beamforming weights in the codebook (212) being based on a first antenna array response matrix ($A(\varphi, \theta)$, $A_{(h)}(\varphi, \theta)$, $A_{(v)}(\varphi, \theta)$) of an antenna array (202, 304) of the transmitter, and the transmitter selecting a set of beamforming weights from the codebook (212) to form by an antenna array (202, 304) a transmit/receive beam pointing in a selected direction, wherein the codebook (212) is constructed using a second antenna array response matrix ($D(\varphi, \theta)$) and the one or more characteristic matrices ($G$, $G_{(h)}$, $G_{(v)}$) received from the transmitter, and wherein the first antenna array response matrix ($A(\varphi, \theta)$, $A_{(h)}(\varphi, \theta)$, $A_{(v)}(\varphi, \theta)$) contains, for a plurality of directions, first array response vectors of the antenna array (202, 304), the second antenna array response matrix ($D(\varphi, \theta)$) contains, for one or more of the plurality of directions, second array response vectors of another antenna array, the other antenna array being different from the transmitter's antenna array (202, 304), and the one or more characteristic matrices ($G$, $G_{(h)}$, $G_{(v)}$) describing one or more characteristics of the transmitter's antenna array (202, 304).

A 25$^{th}$ embodiment provides non-transitory computer program product comprising a computer readable medium storing instructions which, when executed on a computer, perform the method of the 20$^{th}$ embodiment or of the 21$^{st}$ embodiment.

While this invention has been described in terms of several embodiments, there are alterations, permutations, and equivalents which will be apparent to others skilled in the art and which fall within the scope of this invention. It should also be noted that there are many alternative ways of implementing the methods and compositions of the present invention. It is therefore intended that the following appended claims be interpreted as including all such alterations, permutations, and equivalents as fall within the true spirit and scope of the present invention.

REFERENCES

[1] Erik Dahlman, Stefan Parkvall, Johan Sköld, "4G: LTE/LTE-Advanced for Mobile Broadband," Academic Press, 2011. (ISBN:012385489X 9780123854896)
[2] 3GPP TS 36.211 V10.7.0, "3rd Generation Partnership Project; Technical Specification Group Radio Access Network; Evolved Universal Terrestrial Radio Access (E-UTRA); Physical Channels and Modulation (Release 10)," February 2013.
[3] 3GPP TR 36.897 V13.0.0, "3rd Generation Partnership Project; Technical Specification Group Radio Access Network; Study on elevation beamforming/Full-Dimension (FD) Multiple Input Multiple Output (MIMO) for LTE (Release 13)," June 2015.
[4] Cheng et al., "Two-dimensional Discrete Fourier Transform based Codebook for Elevation Beamforming," United States Patent Application, US2016/0173180 A1, June 2016.
[5] Buhren M., Pesavento M., and Bohme J. F., "Virtual array design for array interpolation using differential geometry," *In international conference on Acoustics, Speech, and Signal Processing*, 2004.
[6] Mathews, Cherian P., and Michael D. Zoltowski. "Eigenstructure techniques for 2-D angle estimation with uniform circular arrays." *IEEE Transactions on signal processing, Vol.* 42, no. 9, PP. 2395-2407, 1994.
[7] Florian Roemer, Mohamed Ibrahim, Roman Alieiev, Markus Landmann, Reiner S. Thoma, and Giovanni Del Galdo, "Polarimetric Compressive Sensing Based DOA Estimation," Workshop on Smart Antennas, March 2014.
[8] M. Landmann, and R. Thoma, "Common Pitfalls in Multidimensional High Resolution Channel Parameter Estimation", IEEE Digital Signal Processing Workshop, September 2009.

The invention claimed is:

1. A receiver, comprising:
an antenna for a wireless communication with a transmitter; and
a signal processor to receive and process a radio signal received at the antenna via a radio channel,
wherein the receiver is configured to construct a codebook comprising a plurality of sets of beamforming weights for a plurality of directions, the beamforming weights in the codebook being based on a first antenna array response matrix of a transmitter antenna array, and the transmitter selecting a set of beamforming weights from the codebook to form by the transmitter antenna array a transmit/receive beam pointing in a selected direction,
wherein the receiver is configured to calculate one or more characteristic matrices based on a model of the transmitter antenna array using
(a) received position data of antenna elements of the transmitter antenna array and a preferred polarization of each antenna element, and/or
(b) structural and/or geometrical data of the transmitter antenna array,
wherein the receiver is configured to construct the codebook using a second antenna array response matrix and the one or more calculated characteristic matrices,
wherein the first antenna array response matrix comprises, for a plurality of directions, first array response vectors of the transmitter antenna array, the second antenna array response matrix comprises, for one or more of the plurality of directions, second array response vectors of another antenna array, the other antenna array being different from the transmitter antenna array, and the one or more characteristic matrices describing one or more characteristics of the transmitter antenna array, and
wherein the first antenna array response matrix is modeled using the second antenna array response matrix and the one or more characteristic matrices, each of the first array response vectors being a product of a characteristic matrix and corresponding second array response vectors.

2. The receiver of claim 1, wherein the preferred polarization of each antenna element comprises a first polarization or a second polarization, the first and second polarizations being orthogonal to each other.

3. The receiver of claim 1, wherein the structural and/or geometrical data of the transmitter antenna array comprise one or more of a number of antenna elements, and the preferred polarizations of the antenna elements, and a number of distance values at which the antenna elements are arranged.

4. The receiver of claim 3, wherein, in case the transmitter antenna array comprises a cylindrical array, the structural and/or geometrical data comprise a radius of the transmitter antenna array.

5. The receiver of claim 1, wherein the model of the transmitter antenna array considers a directional and non-identical nature of one or more of the respective antennas in the transmitter antenna array, and/or an electromagnetic coupling between the respective antennas in the transmitter antenna array.

6. The receiver of claim 1, wherein the model of the transmitter antenna array describes one or more radiation characteristics of one or more of the antennas of the transmitter antenna array, the radiation characteristics comprising one or more of a phase and an amplitude due to a position of an antenna in the transmitter antenna array, and/or a coupling imbalance, and/or a manufacturing imbalance.

7. The receiver of claim 1, wherein the other antenna array comprises a 1-dimensional antenna array, or a 2-dimensional antenna array or a 3-dimensional antenna array.

8. The receiver of claim 1, wherein the second antenna array response matrix is defined by a 2-dimensional Diskrete Fourier-Transform (2D-DFT) based matrix.

9. The receiver of claim 1, wherein the codebook is acquired from a first codebook modified using the one or more characteristic matrices, the first codebook defined by the second array response vectors of the second antenna array response matrix.

10. The receiver of claim 1, wherein the first antenna array response matrix comprises, for the plurality of directions, the first array response vectors of all antenna ports in the transmitter antenna array.

11. The receiver of claim 10, comprising a first characteristic matrix, the first antenna array response matrix being modeled by the second array response vectors of the second antenna array response matrix and the first characteristic matrix.

12. The receiver of claim 11, wherein the codebook comprises beamforming weights for all antenna ports, the beamforming weights being based on the first antenna array response matrix.

13. The receiver of claim 1, wherein
the first antenna array response matrix comprises a first antenna array response submatrix and a second antenna array response submatrix,
the first antenna array response submatrix comprises, for the plurality of directions, array response vectors of all antenna ports in the transmitter antenna array with respect to a horizontal polarization of a wavefront, and the second antenna array response submatrix comprises, for the same directions as in the first submatrix, array response vectors of all antenna ports in the transmitter antenna array with respect to a vertical polarization of the wavefront.

14. The receiver of claim 13, comprising:

a first characteristic matrix corresponding to the horizontal polarization, the first antenna array response submatrix being modeled by the second array response vectors of the second antenna array response matrix and the first characteristic matrix, and a second characteristic matrix corresponding to the vertical polarization, the second antenna array response submatrix being modeled by the second array response vectors of the second antenna array response matrix and the second characteristic matrix.

15. The receiver of claim 14, wherein:

the codebook comprises a polarimetric codebook, the polarimetric codebook comprising a first sub-codebook and a second sub-codebook, the first sub-codebook comprises beamforming weights for all antenna ports with respect to the horizontal polarization, the beamforming weights being based on the first antenna array response submatrix, and the second sub-codebook comprises beamforming weights for all antenna ports with respect to the vertical polarization, the beamforming weights being based on the second antenna array response submatrix.

16. The receiver of claim 1, wherein the transmitter is configured to transmit the one or more characteristic matrices to one or more receivers as part of control information for the receiver.

17. The receiver of claim 1, wherein the transmitter antenna array comprises a 1-dimensional antenna array, or a 2-dimensional antenna array or a 3-dimensional antenna array, and the 2-dimensional antenna array or the 3-dimensional antenna array controls a radio wave for beamforming both in a vertical direction and a horizontal direction, a precoder comprising a dual-stage structure, including a first stage comprising the sets of beamforming weights based on the codebook to be applied to each antenna of the transmitter antenna array, and a second stage comprising coefficients that select and/or linearly combine beams defined by the first stage to acquire a desired beam pattern.

18. The receiver of claim 1, comprising:

a channel estimator to estimate a state of the radio channel, wherein the receiver is configured to determine, based on the radio channel estimation and the constructed codebook, feedback to the transmitter, the transmitter selecting, on a basis of the feedback, a set of beamforming weights from the codebook to form the transmit/receive beam, and wherein the feedback comprises control signals on a basis of which the transmitter selects a set of beamforming weights, or the feedback transmits a set of beamforming weights from the receiver to the transmitter.

19. A wireless communication network, comprising:

a transmitter; and one or more receivers of claim 1.

20. The wireless communication network of claim 19, wherein the transmitter comprises a base station serving a user equipment, or a user equipment served by a base station, or the receiver comprises a base station serving a user equipment, or a user equipment served by a base station.

21. A method, comprising:

receiving and processing, at a receiver comprising an antenna for a wireless communication with a transmitter, a radio signal received at the antenna via a radio channel;

calculating, at the receiver, one or more characteristic matrices based on a model of a transmitter antenna array of the transmitter using (a) received position data of antenna elements of the transmitter antenna array and a preferred polarization of each antenna element, and/or (b) structural and/or geometrical data of the transmitter antenna array; and constructing a codebook at the receiver, the codebook comprising a plurality of sets of beamforming weights for a plurality of directions, the beamforming weights in the codebook being based on a first antenna array response matrix of the transmitter antenna array, and the transmitter selecting a set of beamforming weights from the codebook to form by the transmitter antenna array a transmit/receive beam pointing in a selected direction, wherein the codebook is constructed using a second antenna array response matrix and the one or more calculated characteristic matrices, wherein the first antenna array response matrix comprises, for a plurality of directions, first array response vectors of the transmitter antenna array, the second antenna array response matrix comprises, for one or more of the plurality of directions, second array response vectors of another antenna array, the other antenna array being different from the transmitter antenna array, and the one or more characteristic matrices describing one or more characteristics of the transmitter antenna array, and wherein the first antenna array response matrix is modeled using the second antenna array response matrix and the one or more characteristic matrices, each of the first array response vectors being a product of a characteristic matrix and corresponding second array response vectors.

22. A non-transitory digital storage medium having stored thereon a computer program for performing a method, the method comprising:

receiving and processing, at a receiver comprising an antenna for a wireless communication with a transmitter, a radio signal received at the antenna via a radio channel;

calculating, at the receiver, one or more characteristic matrices based on a model of a transmitter antenna array of the transmitter using (a) received position data of antenna elements of the transmitter antenna array and a preferred polarization of each antenna element, and/or (b) structural and/or geometrical data of the transmitter antenna array; and constructing a codebook at the receiver, the codebook comprising a plurality of sets of beamforming weights for a plurality of directions, the beamforming weights in the codebook being based on a first antenna array response matrix of the transmitter antenna array, and the transmitter selecting a set of beamforming weights from the codebook to form by the transmitter antenna array a transmit/receive beam pointing in a selected direction, wherein the codebook is constructed using a second antenna array response matrix and the one or more calculated characteristic matrices, wherein the first antenna array response matrix comprises, for a plurality of directions, first array response vectors of the transmitter antenna array, the second antenna array response matrix comprises, for one or more of the plurality of directions, second array response vectors of another antenna array, the other antenna array being different from the transmitter antenna array, and the one or more characteristic matrices describing one or more characteristics of the transmitter antenna array, and wherein the first antenna array response matrix is modeled using the second antenna array response matrix and the one or more characteristic matrices, each of the first array response vectors being a product of a characteristic matrix and corresponding second array response vectors, when said computer program is run by a computer.

* * * * *